(12) United States Patent
Nakano

(10) Patent No.: US 10,546,220 B2
(45) Date of Patent: Jan. 28, 2020

(54) IMAGE PROCESSING APPARATUS THAT GENERATES HALFTONE IMAGE, IMAGE PROCESSING METHOD, AND STORAGE MEDIUM

(71) Applicant: CANON KABUSHIKI KAISHA, Tokyo (JP)

(72) Inventor: Toshimitsu Nakano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/178,074

(22) Filed: Nov. 1, 2018

(65) Prior Publication Data
US 2019/0156165 A1   May 23, 2019

(30) Foreign Application Priority Data

Nov. 22, 2017 (JP) .................................. 2017-224582

(51) Int. Cl.
*G06K 15/02* (2006.01)
(52) U.S. Cl.
CPC ................................ *G06K 15/1881* (2013.01)
(58) Field of Classification Search
CPC ....... G06K 15/1881; H04N 1/405; H04N 1/52
See application file for complete search history.

(56) References Cited

U.S. PATENT DOCUMENTS 8,384,956 B2  2/2013 Nakano
9,894,244 B2  2/2018 Nakano

FOREIGN PATENT DOCUMENTS

JP         2008-227770 A      9/2008

*Primary Examiner* — Christopher Wait
(74) *Attorney, Agent, or Firm* — Venable LLP

(57) ABSTRACT

It is made possible to prevent deterioration in quality of a thin line or character, which results from pseudo halftone processing. The image processing apparatus of the present invention includes: a generation unit configured to generate halftone image data in which a dot pattern is formed for each cell, which is a unit representing a tone level, by performing halftone processing using the first threshold value matrix for multi-value input image data, and in the first threshold value matrix, threshold values for forming the dot pattern are arranged for each cell and further, in threshold value arrangement for each cell of the first threshold value matrix, the second smallest threshold value within the cell is arranged at a position neighboring a position at which the smallest threshold value within the cell is arranged, and the position at which the second smallest threshold value is arranged is different between adjacent cells.

17 Claims, 27 Drawing Sheets

FIG. 5A (501)

|    | 0 | 1 | 2 | 3 | 4 | 5 | 6 | 7 | 8 | 9 | 10 | 11 | 12 | 13 | 14 | 15 |
|----|---|---|---|---|---|---|---|---|---|---|----|----|----|----|----|----|
| 0  | 64 | 48 | 56 | 112 | 143 | 199 | 191 | 135 | 66 | 50 | 58 | 114 | 145 | 201 | 193 | 137 |
| 1  | 40 | 0 | 8 | 72 | 207 | 247 | 239 | 183 | 42 | 2 | 10 | 74 | 209 | 249 | 241 | 185 |
| 2  | 32 | 24 | 16 | 80 | 215 | 223 | 231 | 175 | 34 | 26 | 18 | 82 | 217 | 225 | 233 | 177 |
| 3  | 104 | 96 | 88 | 120 | 151 | 159 | 167 | 127 | 106 | 98 | 90 | 122 | 153 | 161 | 169 | 129 |
| 4  | 149 | 205 | 197 | 141 | 68 | 52 | 60 | 116 | 147 | 203 | 195 | 139 | 70 | 54 | 62 | 118 |
| 5  | 213 | 253 | 245 | 189 | 44 | 4 | 12 | 76 | 211 | 251 | 243 | 187 | 46 | 6 | 14 | 78 |
| 6  | 221 | 229 | 237 | 181 | 36 | 28 | 20 | 84 | 219 | 227 | 235 | 179 | 38 | 30 | 22 | 86 |
| 7  | 157 | 165 | 173 | 133 | 108 | 100 | 92 | 124 | 155 | 163 | 171 | 131 | 110 | 102 | 94 | 126 |
| 8  | 67 | 51 | 59 | 115 | 146 | 202 | 194 | 138 | 65 | 49 | 57 | 113 | 144 | 200 | 192 | 136 |
| 9  | 43 | 3 | 11 | 75 | 210 | 250 | 242 | 186 | 41 | 1 | 9 | 73 | 208 | 248 | 240 | 184 |
| 10 | 35 | 27 | 19 | 83 | 218 | 226 | 234 | 178 | 33 | 25 | 17 | 81 | 216 | 224 | 232 | 176 |
| 11 | 107 | 99 | 91 | 123 | 154 | 162 | 170 | 130 | 105 | 97 | 89 | 121 | 152 | 160 | 168 | 128 |
| 12 | 148 | 204 | 196 | 140 | 71 | 55 | 63 | 119 | 150 | 206 | 198 | 142 | 69 | 53 | 61 | 117 |
| 13 | 212 | 252 | 244 | 188 | 47 | 7 | 15 | 79 | 214 | 254 | 246 | 190 | 45 | 5 | 13 | 77 |
| 14 | 220 | 228 | 236 | 180 | 39 | 31 | 23 | 87 | 222 | 230 | 238 | 182 | 37 | 29 | 21 | 85 |
| 15 | 156 | 164 | 172 | 132 | 111 | 103 | 95 | 127 | 158 | 166 | 174 | 134 | 109 | 101 | 93 | 125 |

FIG. 5B (502)

|    | 0 | 1 | 2 | 3 | 4 | 5 | 6 | 7 | 8 | 9 | 10 | 11 | 12 | 13 | 14 | 15 |
|----|---|---|---|---|---|---|---|---|---|---|----|----|----|----|----|----|
| 0  | 0 | 0 | 0 | 0 | 0 | 0 | 0 | 0 | 0 | 0 | 0 | 0 | 0 | 0 | 0 | 0 |
| 1  | 0 | 0 | 140 | 140 | 140 | 140 | 140 | 140 | 140 | 140 | 140 | 140 | 140 | 0 | 0 | 0 |
| 2  | 0 | 0 | 140 | 140 | 140 | 140 | 140 | 140 | 140 | 140 | 140 | 140 | 140 | 0 | 0 | 0 |
| 3  | 0 | 0 | 140 | 140 | 140 | 140 | 140 | 140 | 140 | 140 | 140 | 140 | 140 | 0 | 0 | 0 |
| 4  | 0 | 0 | 140 | 140 | 140 | 140 | 0 | 0 | 0 | 0 | 0 | 0 | 0 | 0 | 0 | 0 |
| 5  | 0 | 0 | 140 | 140 | 140 | 140 | 0 | 0 | 0 | 0 | 0 | 0 | 0 | 0 | 0 | 0 |
| 6  | 0 | 0 | 140 | 140 | 140 | 140 | 0 | 0 | 0 | 0 | 0 | 0 | 0 | 0 | 0 | 0 |
| 7  | 0 | 0 | 140 | 140 | 140 | 140 | 140 | 140 | 140 | 140 | 140 | 140 | 140 | 0 | 0 | 0 |
| 8  | 0 | 0 | 140 | 140 | 140 | 140 | 140 | 140 | 140 | 140 | 140 | 140 | 140 | 0 | 0 | 0 |
| 9  | 0 | 0 | 140 | 140 | 140 | 140 | 0 | 0 | 0 | 0 | 0 | 0 | 0 | 0 | 0 | 0 |
| 10 | 0 | 0 | 140 | 140 | 140 | 140 | 0 | 0 | 0 | 0 | 0 | 0 | 0 | 0 | 0 | 0 |
| 11 | 0 | 0 | 140 | 140 | 140 | 140 | 140 | 140 | 140 | 140 | 140 | 140 | 140 | 0 | 0 | 0 |
| 12 | 0 | 0 | 140 | 140 | 140 | 140 | 140 | 140 | 140 | 140 | 140 | 140 | 140 | 0 | 0 | 0 |
| 13 | 0 | 0 | 140 | 140 | 140 | 140 | 140 | 140 | 140 | 140 | 140 | 140 | 140 | 0 | 0 | 0 |
| 14 | 0 | 0 | 140 | 140 | 140 | 140 | 140 | 140 | 140 | 140 | 140 | 140 | 140 | 0 | 0 | 0 |
| 15 | 0 | 0 | 0 | 0 | 0 | 0 | 0 | 0 | 0 | 0 | 0 | 0 | 0 | 0 | 0 | 0 |

IMAGE PROCESSING APPARATUS THAT GENERATES HALFTONE IMAGE, IMAGE PROCESSING METHOD, AND STORAGE MEDIUM

BACKGROUND OF THE INVENTION

Field of the Invention

The present invention relates to a technique of pseudo halftone processing by a dither method.

Description of the Related Art

An electrophotographic image forming apparatus performs printing by forming a latent image by exposing a photoconductor drum with a light-emitting element, such as a laser beam, developing the latent image by toner, which is electrified color materials, and transferring and fixing the developed toner onto a printing medium. It is frequent for such an image forming apparatus to be capable of producing an output only at a low tone level in units of pixels. Consequently, in order to reproduce a halftone representation of print-target image data stably and faithfully, processing to reduce the number of tone levels in units of pixels is performed by performing pseudo halftone processing that represents multiple tone levels by using a plurality of pixels having two tone levels for multi-value image data representing multiple tone levels in units of pixels. Japanese Patent Laid-Open No. 2008-227770 has disclosed a method of pseudo halftone processing that improves reproducibility of a highlight portion (low-density portion).

A thin line or character (in particular, a small point character having an area whose width is narrow) in a highlight portion has a small number of corresponding lit pixels in image data represented at a low tone level after pseudo halftone processing. Because of this, depending on the drawing position of a thin line or character, there is a possibility that drawing failure, such as drawing omission, occurs in a highlight portion. The method described in Japanese Patent Laid-Open No. 2008-227770 does not take into consideration the drawing failure of a thin line or character such as this. Consequently, an object of the present invention is to provide an image processing apparatus capable of preventing deterioration in quality of a thin line or character, which may result from pseudo halftone processing.

SUMMARY OF THE INVENTION

The image processing apparatus according to the present invention includes: a memory device storing at least a first threshold value matrix as a threshold value matrix used in halftone processing; and a controller having at least one processor which executes a set of instructions or having at least one circuitry, the controller being configured to act as: a generation unit configured to generate halftone image data in which a dot pattern is formed for each cell, which a unit representing a tone level, by performing halftone processing using the first threshold value matrix for multi-value input image data, and in the first threshold value matrix, threshold values for forming the dot pattern are arranged for each cell and further, in threshold value arrangement for each cell of the first threshold value matrix, the second smallest threshold value within the cell is arranged at a position neighboring a position at which the smallest threshold value within the cell is arranged, and the position at which the second smallest threshold value is arranged is different between adjacent cells.

Further features of the present invention will become apparent from the following description of exemplary embodiments with reference to the attached drawings.

BRIEF DESCRIPTION OF THE DRAWINGS

FIG. 5A to FIG. 5C are diagrams for explaining pseudo halftone processing by a dither method;

FIG. 6 is a diagram showing an example of a cell of a general dither matrix;

FIG. 8A and FIG. 8B are diagrams showing the way a binary bitmap is generated by pseudo halftone processing using a general dither matrix;

FIG. 10 is a diagram for explaining cells making up a dither matrix of different direction growth according to the first embodiment;

FIG. 11 is a diagram showing an example of a configuration of the dither matrix of different direction growth according to the first embodiment;

FIG. 13 is a diagram for explaining cells making up a dither matrix of different direction growth according to a second embodiment;

FIG. 14 is a diagram showing an example of a configuration of the dither matrix of different direction growth according to the second embodiment;

DESCRIPTION OF THE EMBODIMENTS

In the following, embodiments for embodying the present invention are explained by using the drawings. In the following embodiments, a case where the present invention is applied to a multi function peripheral (MFP) including a plurality of functions, such as a copy function and a printer function, is taken as an example. Components described in the following embodiments show aspects as examples of the present invention and are not intended to limit the scope of the present invention only to those.

First Embodiment

In a first embodiment, an example of an image processing apparatus that suppresses drawing incomplete and drawing omission of a low-density thin line or character (in particular, a small point character having an area whose width is narrow), which results from pseudo halftone processing, is explained. In the present embodiment, it is premised that pseudo halftone processing by a dither method is performed in the image processing apparatus. Here, the dither method is explained briefly. In the dither method, a threshold value table called a dither matrix is used. Then, the pixel value of each pixel of image data and the corresponding threshold value within the threshold value table are compared and the target pixel is set to on (lit) or off (unlit). In this manner, in the dither method, a dot pattern is formed for each cell, which is a unit representing a tone level, and pseudo halftone image (halftone image) is generated.

[Image Forming System]

Figure 1:
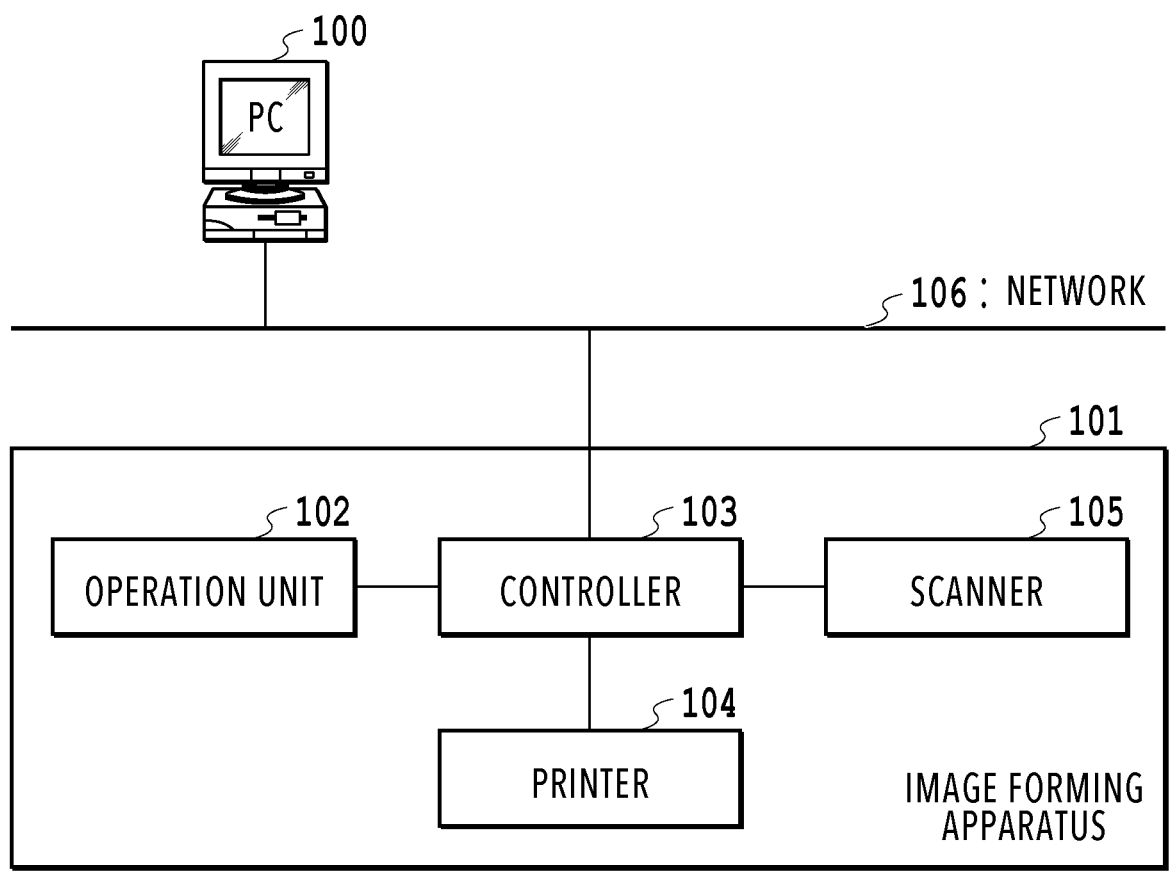
FIG. 1 is a block diagram showing an example of a configuration of an image forming system including an image processing apparatus according to a first embodiment.

FIG. 1 is a block diagram showing an example of a configuration of an image forming system including an image processing apparatus according to the first embodiment. In the image forming system shown in FIG. 1, a host computer (hereinafter, referred to as PC) 100 and an image forming apparatus 101 are connected via a network 106. In the image forming system shown in FIG. 1, one PC and one image forming apparatus are illustrated, but a plurality of PCs and image forming apparatuses may exist and they may be connected to one another. Further, in the image forming system shown in FIG. 1, as the connection method, a network is applied, but this is not limited. For example, as the connection method, it is also possible to apply the serial transmission scheme, such as USB, the parallel transmission scheme, such as Centronics and SCSI, and so on.

The PC 100 has functions of a personal computer. The PC 100 transmits and receives data via the network 106. In the present embodiment, the PC 100 transmits drawing data via a printer driver to the image forming apparatus 101.

The image forming apparatus 101 has a printer 104, which is an image output device, an operation unit 102 configured to display a plurality of keys for a user to give instructions and various kinds of information to be reported to a user, and a scanner 105 that reads a document image. Further, the image forming apparatus 101 has a controller 103 in charge of the operation control of the entire image forming apparatus 101.

[Controller]

Figure 2:
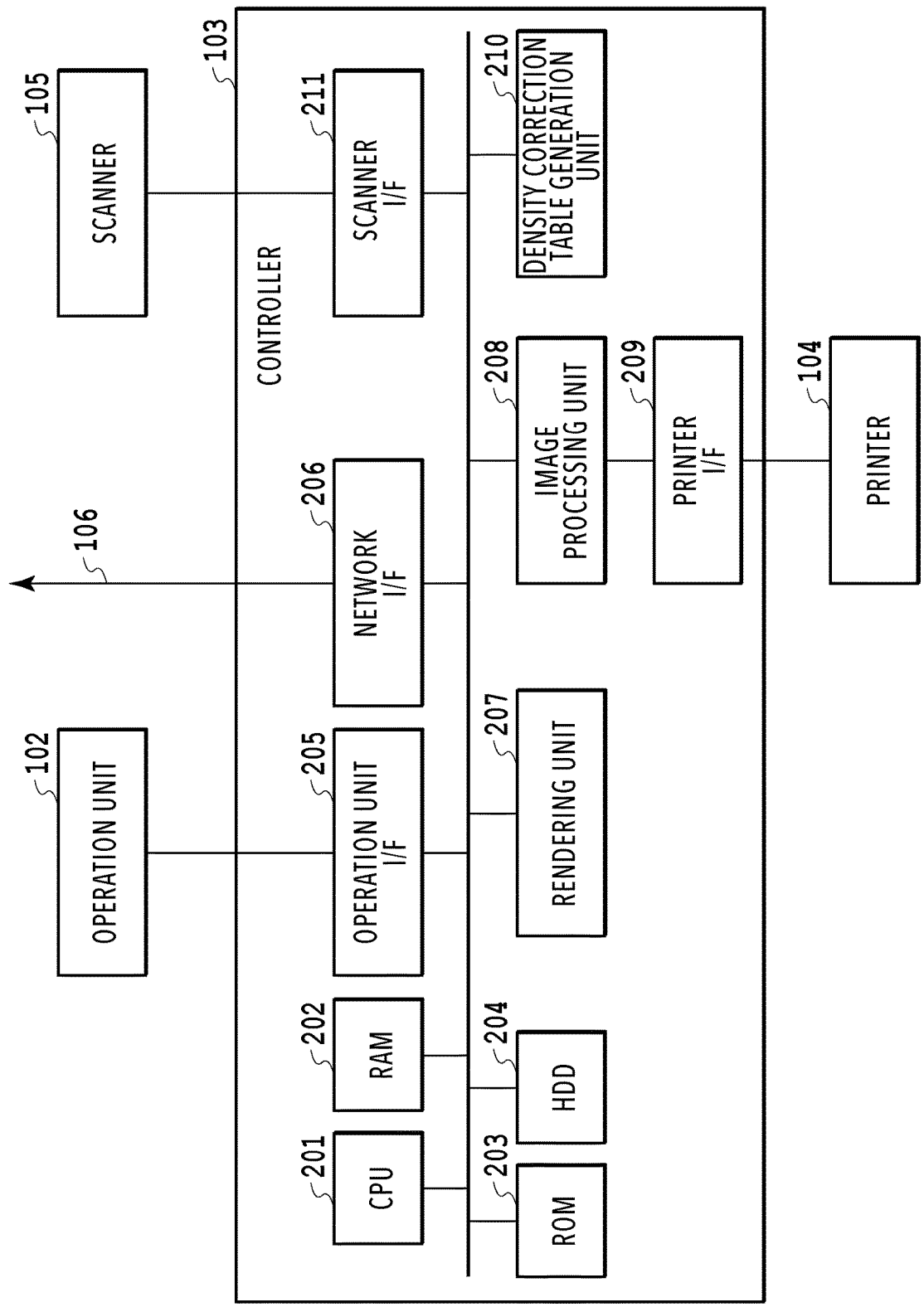
FIG. 2 is a block diagram showing an example of a configuration of a controller of an image forming apparatus.

FIG. 2 is a block diagram showing an example of the configuration of the controller 103 of the image forming apparatus 101. The controller (also called image processing apparatus) 103 has a CPU 201, a RAM 202, a ROM 203, an HDD (Hard Disk Drive) 204, a rendering unit 207, an image processing unit 208, and a density correction table generation unit 210. Further, the controller 103 has an operation unit I/F 205, a network I/F 206, a printer I/F 209, and a scanner I/F 211. Furthermore, the controller 103 is connected with the PC 100, an external image forming apparatus and so on via the network 106. Due to this, it is possible for the controller 103 to input and output drawing data and device information. The configuration of the controller 103 is not limited to the configuration shown in FIG. 2. For example, the HDD 204 and the like may be arranged outside the controller 103.

The CPU 201 centralizedly controls access to various devices being connected based on control programs and the like stored in the ROM 203 and at the same time, centralizedly controls various kinds of processing, such as image processing, performed inside the controller 103. The RAM 202 is a system work memory for the CPU 201 to operate. The RAM 202 is also used as a memory for temporarily storing image data, such as drawing data and bitmap data. The RAM 202 includes an SRAM that stores stored data also after the power source is turned off and a DRAM from which stored contents are deleted after the power source is turned off. The ROM 203 stores boot programs of devices, and the like. The HDD 204 is a hard disk drive and stores system software, image data, and a threshold value matrix (in the present embodiment, dot concentration type dither matrix) used for pseudo halftone processing, to be described later. Further, in the present embodiment, a case where the threshold value matrix is stored in the HDD 204 is illustrated, but the case is not limited to this. For example, it is also possible to store the threshold value matrix in a nonvolatile memory possessed by the image processing unit 208.

The operation unit I/F 205 is an interface for connecting with the operation unit 102. The operation unit I/F 205 outputs image data that is displayed on the operation unit 102 to the operation unit 102. Further, the operation unit I/F 205 acquires information input to the operation unit 102 from the operation unit 102.

The network I/F 206 is connected to the network 106 and performs transmission and reception of information, such as drawing data and image data, with another device via the network 106. The scanner I/F 211 is connected to the scanner 105 and receives image data obtained by the scanner 105 reading a document image from the scanner 105. The rendering unit 207 receives intermediate data generated based on PDL code data, which is drawing data transmitted from the PC 100 or the like, and generates contone (multi-value) image bitmap data from the intermediate data. Hereinafter, the image bitmap data is represented simply as an image bitmap. The density correction table generation unit 210 generates a density correction table for correcting the pixel value of an image bitmap.

The image processing unit 208 receives an image bitmap generated by the rendering unit 207 and performs image processing for the image bitmap while referring to attribute data attached to the image bitmap. The image bitmap for which image processing has been performed is output to the printer 104 via the printer I/F 209.

[Rendering Processing]

Figure 3:
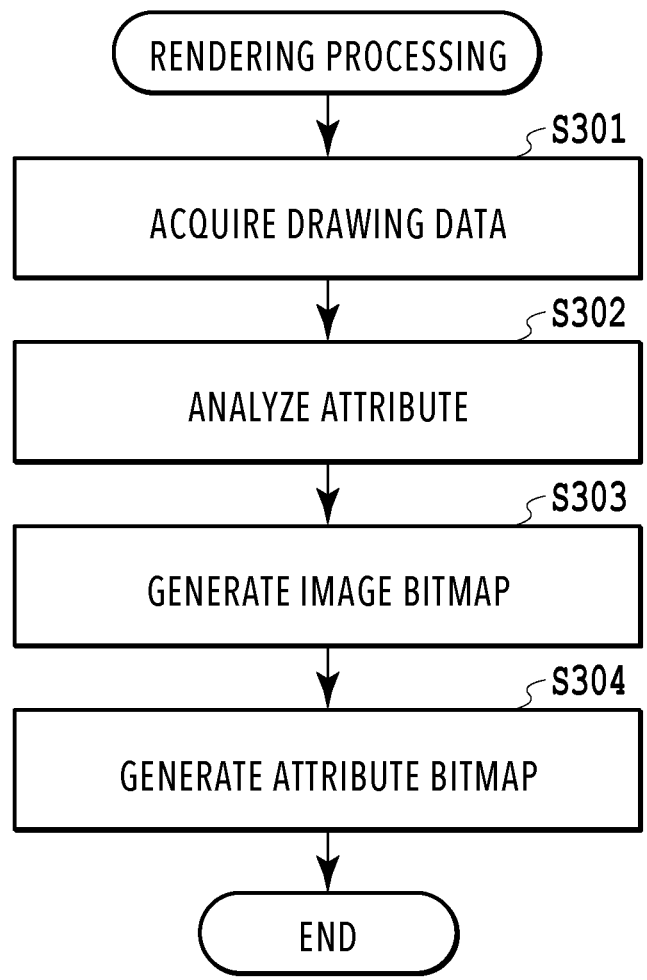
FIG. 3 is a flowchart showing a flow of rendering processing of a rendering unit.

FIG. 3 is a flowchart showing a flow of rendering processing of the rendering unit 207. As shown in FIG. 3, first, the rendering unit 207 acquires drawing data transmitted from the PC 100 or the like (step S301). Then, the rendering unit 207 analyzes the drawing data and determines which attribute of character, line, graphics, and image the drawing data has (step S302). At this time, in the case where the drawing data is information on character drawing represented by a character type, character code and so on, the rendering unit 207 determines that that drawing data has the character attribute. In the case where the drawing data is commands of line drawing represented by a coordinate point, length, and thickness, the rendering unit 207 determines that the drawing data has the line attribute. In the case where the drawing data is commands of graphics drawing represented by a rectangle, shape, and coordinate point, the rendering unit 207 determines that the drawing data has the graphics attribute. In the case where the drawing data is information on image drawing represented by bitmap data, the rendering unit 207 determines that the drawing data has the image attribute. Further, the rendering unit 207 classifies the character attribute into small point character and the other according to character size.

Next, the rendering unit 207 forms a pixel pattern that is drawn in accordance with the processing resolution of the controller from the information on the drawing data and generates an image bitmap indicating information (contone value) on the color drawn in each pixel (step S303). Hereinafter, the information on the color is represented as color information. Further, the rendering unit 207 generates attribute bitmap data storing the attribute analyzed at step S302 so as to correspond to each pixel of the image bitmap and terminates the processing (step S304). Hereinafter, the attribute bitmap data is represented simply as an attribute bitmap. The generated image bitmap and attribute bitmap are stored in the RAM 202 or the HDD 204, or sent to the image processing unit 208.

[Image Processing Unit]

Figure 4:
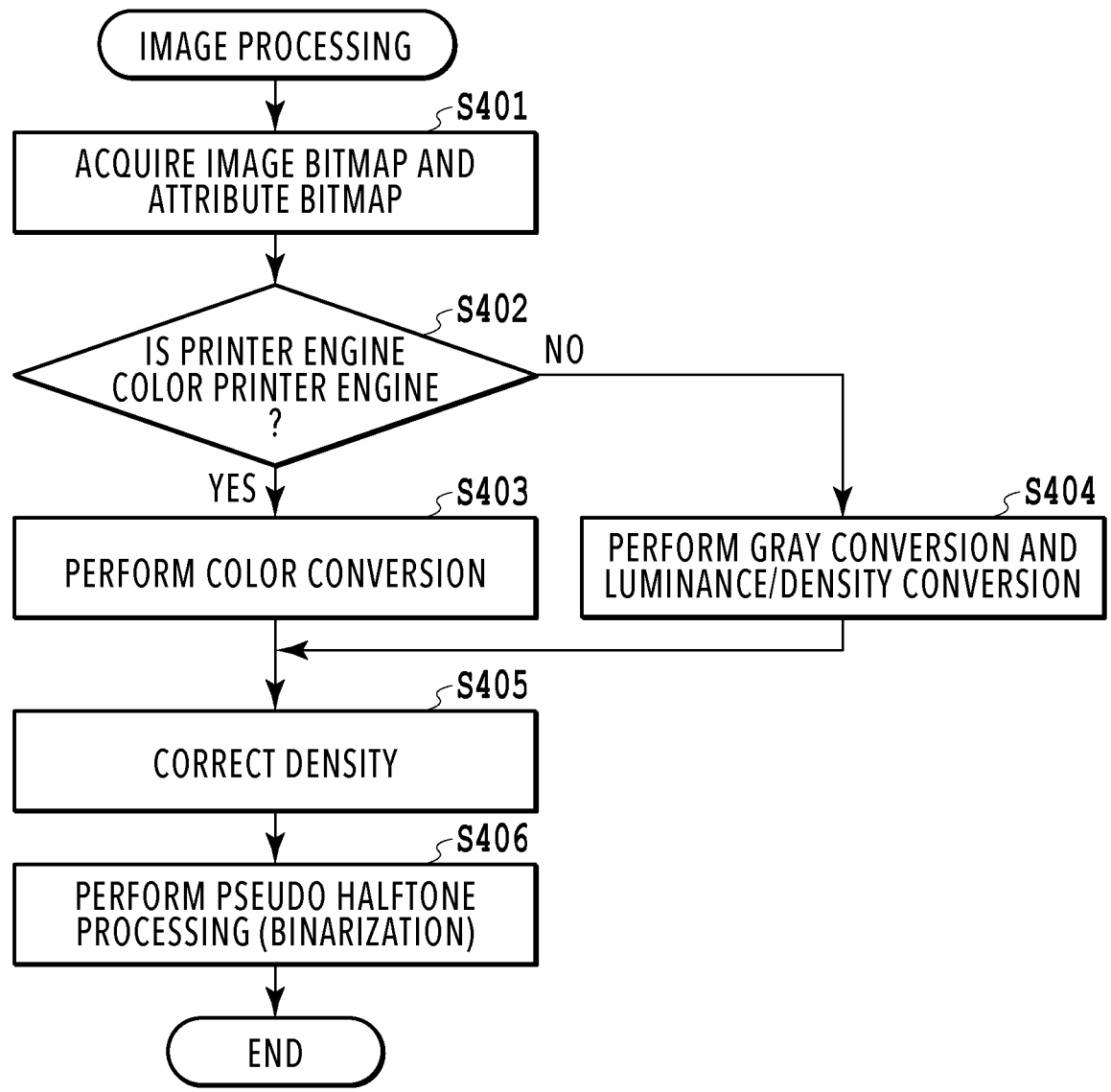
FIG. 4 is a flowchart showing a flow of processing of an image processing unit.

FIG. 4 is a flowchart showing a flow of processing of the image processing unit 208. As shown in FIG. 4, the image processing unit 208 acquires the image bitmap and the attribute bitmap generated by the rendering unit 207 in accordance with the processing resolution of the controller from the rendering unit 207 (step S401). In the case where the image bitmap and the attribute bitmap are stored in the RAM 202 or the HDD 204, each bitmap is read from those storage devices. Next, the image processing unit 208 determines whether the printer engine is a color printer engine (step S402). In the case where it is determined that the printer engine is a color printer engine (YES at step S402), the image processing unit 208 converts the color information on each pixel of the image bitmap into the color format of a color printer engine by a color conversion LUT or matrix arithmetic operation (step S403). The color format of a color printer engine is CMYK. On the other hand, in the case where it is determined that the printer engine is not a color printer engine, that is, the printer engine is a monochrome printer engine (NO at step S402), the image processing unit 208 converts the color information into the value of K used in a monochrome printer engine (step S404). At this time, the image processing unit 208 converts the color information on each pixel of the image bitmap into the value of K by using a gray conversion formula and a luminance/density conversion formula, to be described later.

Next, the image processing unit 208 corrects the pixel value of the image bitmap by using the density correction table of each color in accordance with the attribute information on each pixel of the attribute bitmap (step S405). Finally, the image processing unit 208 selects a dither matrix in accordance with the attribute information on each pixel of the attribute bitmap and performs pseudo halftone processing by the dither method using the selected dither matrix for the pixel of the image bitmap (step S406). The image forming apparatus 101 according to the present embodiment holds the dither matrix for each attribute. For example, the image forming apparatus 101 holds a low screen ruling (for example, 106 lines) dither matrix as the dither matrix for the attribute, such as graphics, for which it is desired to stabilize the density. Further, for example, the image forming apparatus 101 holds a high screen ruling (for example, 212 lines) dither matrix as the dither matrix for the attribute, such as character, for which it is desired to suppress jaggies (roughness).

By the processing as above, each pixel value (contone value) of the image bitmap is converted so as to have two values and binary bitmap data (also called halftone image data) is generated. Hereinafter, the binary bitmap data is simply represented as a binary bitmap. The generated binary bitmap is sent to the printer 104 and the printer 104 performs printing based on the binary bitmap. In the present embodiment, the case where the arithmetic operation of halftone processing in the image processing unit 208 is implemented by a circuit, such as an ASIC and an FPGA, is supposed. However, the case is not limited to this. For example, it may also be possible to implement halftone processing by a processor represented by the CPU 201 and the like executing a program for halftone processing. Further, it is also possible to implement halftone processing by a processor and a circuit in cooperation with each other.

[Pseudo Halftone Processing]

Next, by using FIG. 5A to FIG. 5C, the pseudo halftone processing at step S406 is explained in detail. FIG. 5A to FIG. 5C are diagrams for explaining the pseudo halftone processing by the dither method. In the pseudo halftone processing at step S406, the image processing unit 208 receives image data of the corresponding color from the image bitmap (color image data or monochrome image data). That is, the image processing unit 208 acquires image data of C, image data of M, image data of Y, and image data of K from the color image data. Alternatively, the image processing unit 208 acquires image data of K from the monochrome image data.

The image processing unit 208 reads a threshold value corresponding to each pixel position of the acquired image data (input image data) from the dither matrix in which a threshold value is arranged at each pixel position. Then, the image processing unit 208 compares the pixel value and the read threshold value for each pixel position. Then, the image processing unit 208 outputs 1 (black) in the case where the pixel value is larger than the threshold value and in the other cases, outputs 0 (white), and thus, the image data is binarized. Due to this, image data having two tone levels (halftone image data) in which each pixel has values of 0 (white) and 1 (black) is generated.

In FIG. 5A, an example of a dither matrix with a resolution of 600 dpi is shown. A dither matrix 501 shown in FIG. 5A is a general binary dither matrix used at the time of binarizing image data. A binary dither matrix includes one matrix. An N-value dither matrix used in the case of N-valuing image data includes (N−1) matrixes. In FIG. 5B, an example of image data is shown. Image data 502 shown in FIG. 5B is data of a monochrome image of K with a resolution of 600 dpi including graphics data of the pixel value (140) and blank data of the pixel value (0).

In the case of N-valuing image data, (N−1) matrixes in which (N−1) threshold values are set stepwise at each pixel position are used. Then, from each of the (N−1) matrixes, a threshold value corresponding to each pixel position is read and the pixel value and the read (N−1) threshold values are compared for each pixel position. Then, in accordance with the comparison results, one of values between 0 and N−1 is output. Explanation of details of the configuration of an N-value dither matrix and the N-valuing processing is omitted.

In this manner, the input image data of continuous tone is converted into image data of area gradation including a halftone dot (dot pattern) by the pseudo halftone processing. In FIG. 5C, image data obtained by applying the pseudo halftone processing to the image data 502 is shown. In the case where the pseudo halftone processing is performed for the image data 502 by using the dither matrix 501, of the pixels within the area whose pixel value is 140, for the pixel whose corresponding threshold value is smaller than 140, the pixel value is set to 1 (black). On the other hand, for the pixel whose corresponding threshold value is larger than or equal to 140, the pixel value is set to 0 (white). Due to this, binary bitmap data 503 as shown in FIG. 5C is generated.

Here, the case where monochrome image data of K is input is explained, but in the case where color image data is input, it may also be possible to use a dither matrix different for each of the color planes of CMYK.

[Configuration of General Dither Matrix]

Figure 6:
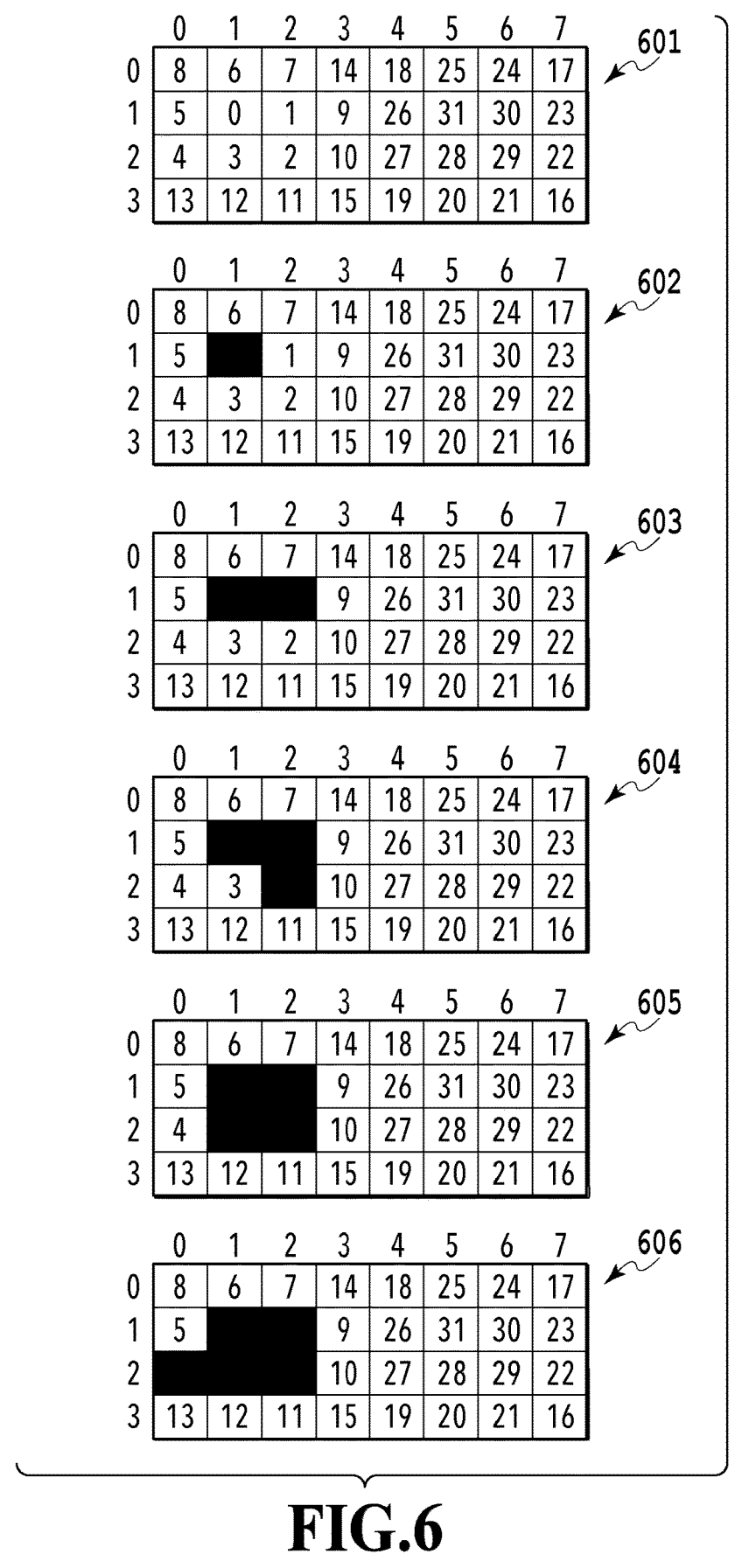
Figure 7:
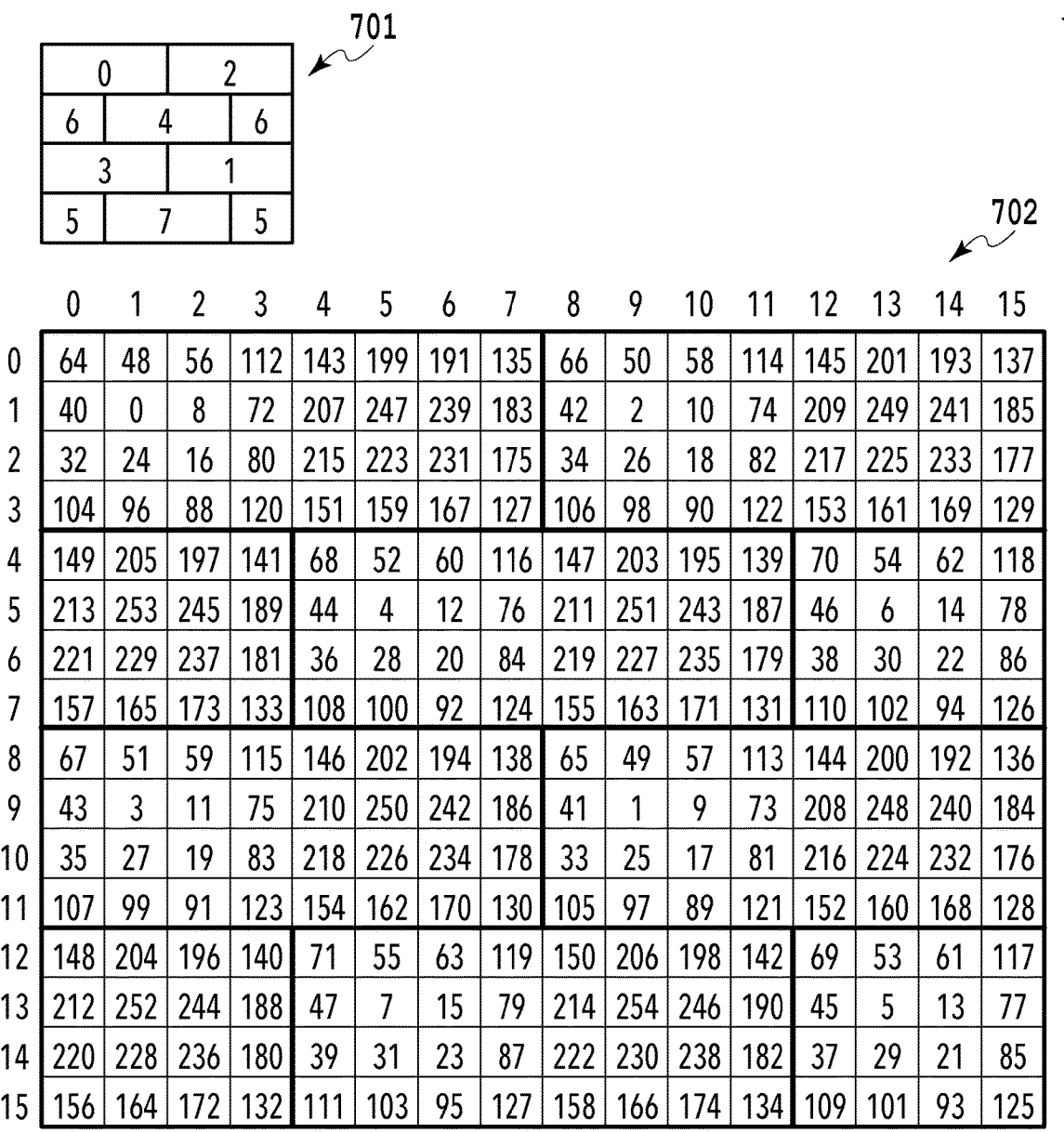
FIG. 7 is a diagram showing an example of a configuration of a general dither matrix.

Next, by using FIG. 6 and FIG. 7, details of the configuration of a general dither matrix are explained. A dither matrix is made up by combining a plurality of cells forming one dot pattern. FIG. 6 is a diagram showing an example of a cell of a general dither matrix. A cell is a matrix of an N×M size and to each element, a value (threshold value) indicating an order of lighting a dot is set. In FIG. 6, a cell of a dither matrix whose screen angle is 45 degrees and screen ruling is 106 lines is illustrated. A cell 601 shown in FIG. 6 is a cell of a matrix of an 8×4 size and one dot pattern is formed by lighting dots in the order from the element to which a small value is set. Cells 602 to 606 shown in FIG. 6 show the way a dot pattern is formed in the cell 601. As shown in the cell 602, lighting starts from the dot an element (1, 1) to which 0, the smallest value, is set. An element (x, y) indicates an element whose position in the cell is (x, y). Further, x represents a column number and y represents a row number.

Next, as shown in the cell 603, the dot of an element (2, 1) to which 1, the second smallest value, is set is lit. Then, as shown in the cell 604, the cell 605, and the cell 606, a dot pattern is formed by sequentially lighting dots. A tone level is represented by the size of the dot pattern and it is possible to represent 32 tone levels by the cell of an 8×4 size.

FIG. 7 is a diagram showing an example of the configuration of a general dither matrix. In order to represent 256 tone levels by pseudo halftone processing for image data capable of representing 256 tone levels, in which to the pixel value, a value between 0 and 255 is set, a dither matrix combining the eight cells of an 8×4 size as shown in FIG. 6 is necessary.

By arranging the eight cells as shown in FIG. 6 while shifting the cells and setting the lighting order of each of the arranged cells, a dither matrix of a 16×16 size as shown in FIG. 7, in which to each element, one of values (threshold values) capable of representing 256 tone levels is set, is obtained. A dither matrix 701 shown in FIG. 7 represents a dither matrix in units of cells and the value within each cell indicates the lighting order of the cell. A dither matrix 702 represents the dither matrix 701 in units of elements. The thick line within the dither matrix 702 indicates the boundary between cells.

[Generation of Binary Bitmap by General Dither Matrix]

Next, by using FIG. 8A, FIG. 8B, and FIG. 9A to FIG. 9C, generation of a binary bitmap by pseudo halftone processing using the general dither matrix 702 is explained.

Figure 8A:
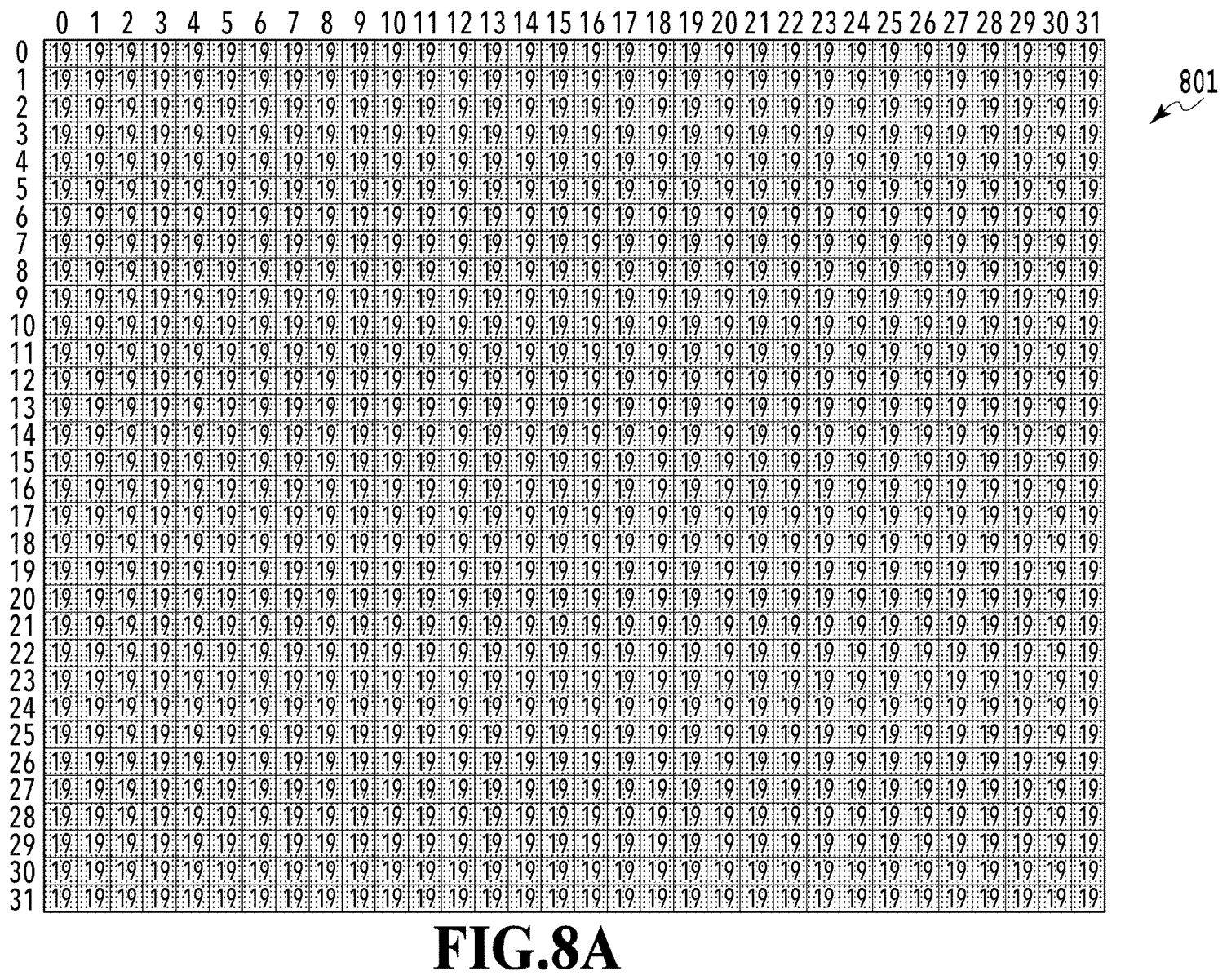
Figure 8B:
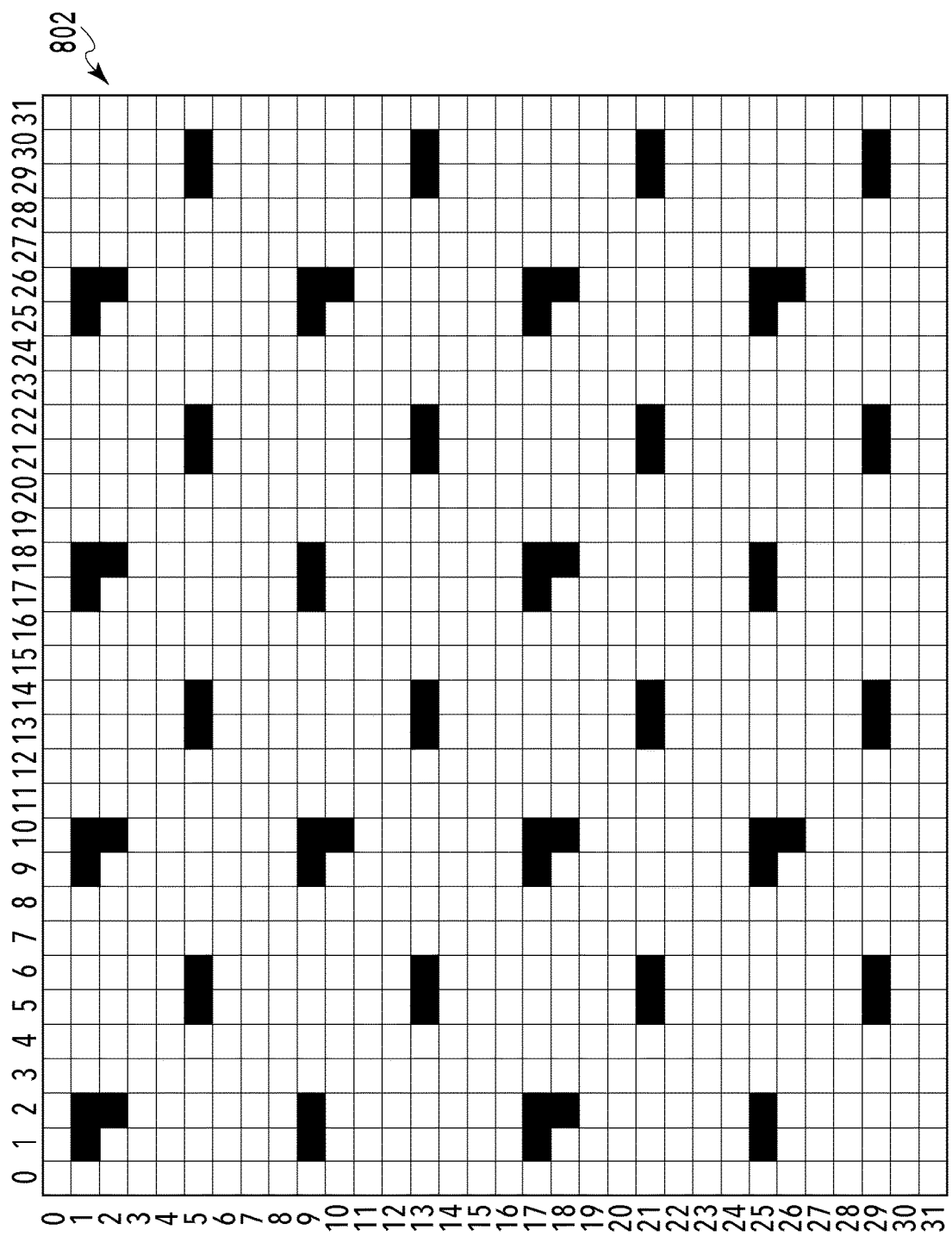

First, by using FIG. 8A and FIG. 8B, the case where graphics whose color signals of all pixels are yellow (R=255, G=255, B=0) is printed by a monochrome printer is explained. In the monochrome printer, the RGB data of the color signal of yellow is converted into K data (image data represented by the value of k) by the gray conversion processing and the luminance/density conversion processing at step S404. FIG. 8A shows image data 801 obtained in the case where gray conversion and luminance/density conversion are performed for the yellow graphics by the monochrome printer.

In the monochrome printer, in accordance with expression 1 below, the color signal of yellow (R=255, G=255, B=0) is converted into a gray value (hereinafter, described as Gray sometimes). By this conversion, a gray value of 236 is obtained. Expression 1 is a conversion formula for performing gray conversion for a color signal in the sRGB color space.

$$\text{Gray}=0.212R+0.715G+0.0722B \qquad \text{(expression 1)}$$

Further, in the monochrome printer, in accordance with expression 2 below, a gray value (luminance value) is converted into a density value. By this conversion, K=19 is obtained. Expression 2 is a luminance/density conversion formula.

$$K=255-\text{Gray} \qquad \text{(expression 2)}$$

As a result, in the monochrome printer, the yellow color signal (R=255, G=255, B=0) is converted into a value of K (19). By this, the yellow graphics is represented by the image data 801 having the K value (19) for each pixel value as shown in FIG. 8A.

FIG. 8B shows a binary bitmap 802 obtained by performing pseudo halftone processing for the image data 801 by using the dither matrix 702. In the pseudo halftone processing, the dither matrix 702 is arranged for the image data 801 so that a top position (0, 0) of the dither matrix 702 is located at a top position (0, 0) of the image data 801. Then, the threshold value corresponding to each pixel of the image data 801 is read from the dither matrix 702 and the pixel value of each pixel and the threshold value corresponding to each pixel are compared. Then, of each of the pixels of the image data 801, to a pixel whose pixel value is larger than the threshold value, 1 (black) is set. On the other hand, of each of the pixels of the image data 801, to a pixel whose pixel value is smaller than or equal to the threshold value, 0 (white) is set. In the case where the size of image data is larger than the size of a dither matrix, the dither matrix is arranged repeatedly in accordance with the size of the image data.

For example, for the pixel at the position (0, 0) of the image data 801 (hereinafter, described as pixel (0, 0)), the pixel value (19) of the pixel and the threshold value (64) of an element (0, 0) of the dither matrix 702, which corresponds to the position of the pixel, are compared. The pixel value (19) is smaller than the threshold value (64), and therefore, to the pixel (0, 0) of the binary bitmap 802, 0 (white) is set. Further, for example, for a pixel (2, 1) of the image data 801, the pixel value (19) of the pixel and the threshold value (8) of an element (2, 1) of the dither matrix 702, which corresponds to the position of the pixel, are compared. The pixel value (19) is larger than the threshold value (8), and therefore, to the pixel (2, 1) of the binary bitmap 802, 1 (black) is set. By similarly performing pseudo halftone processing for all the pixels of the image data 801, the binary bitmap 802 shown in FIG. 8B is generated. In this manner, the yellow graphics shown in FIG. 8A becomes a binary bitmap made up of two-pixel or three-pixel dot patterns shown in FIG. 8B.

Figure 9A:
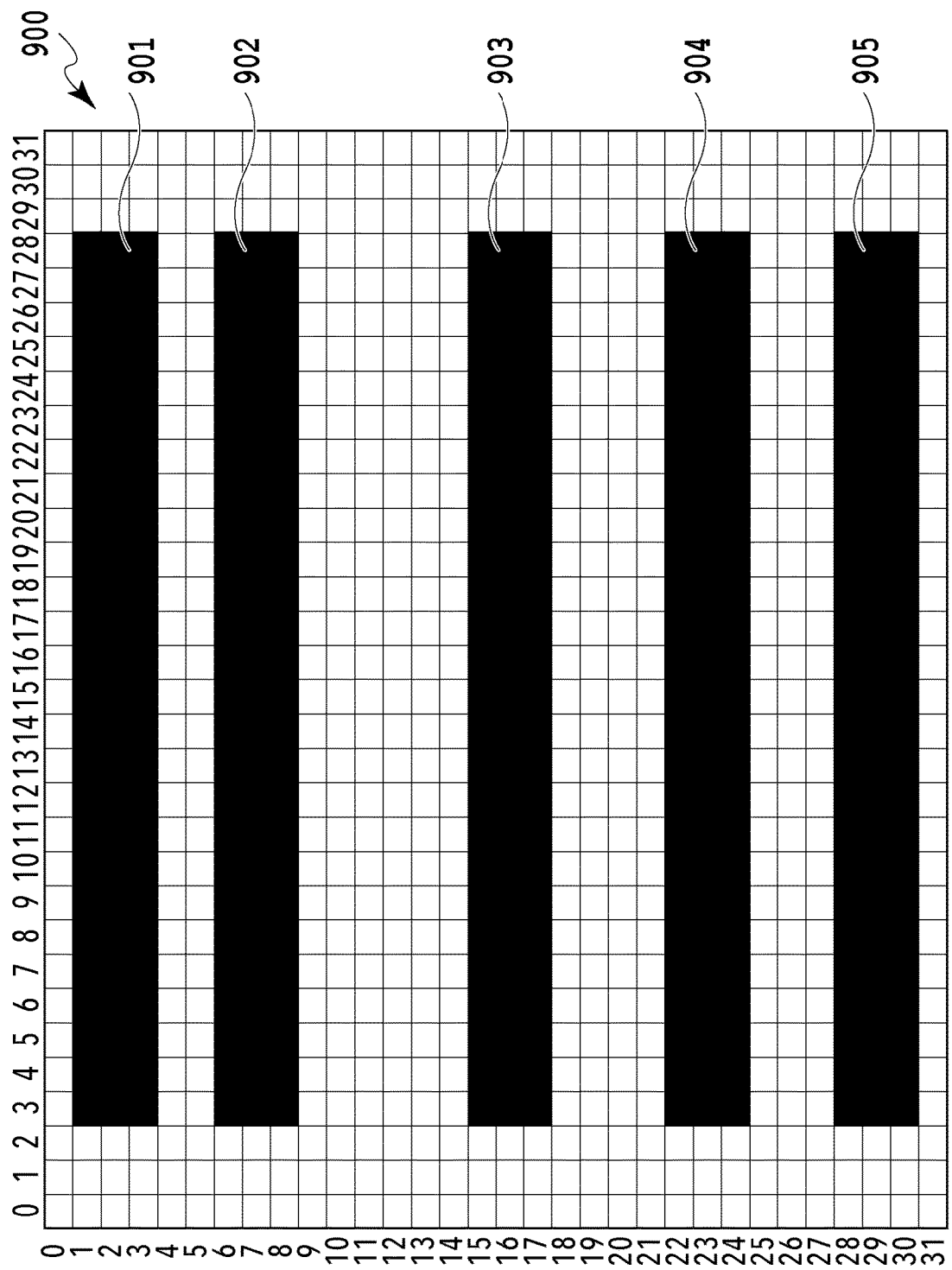
FIG. 9A to FIG. 9C are diagrams showing the way a yellow thin line having a width of three pixels is printed by a monochrome printer.
Figure 9B:
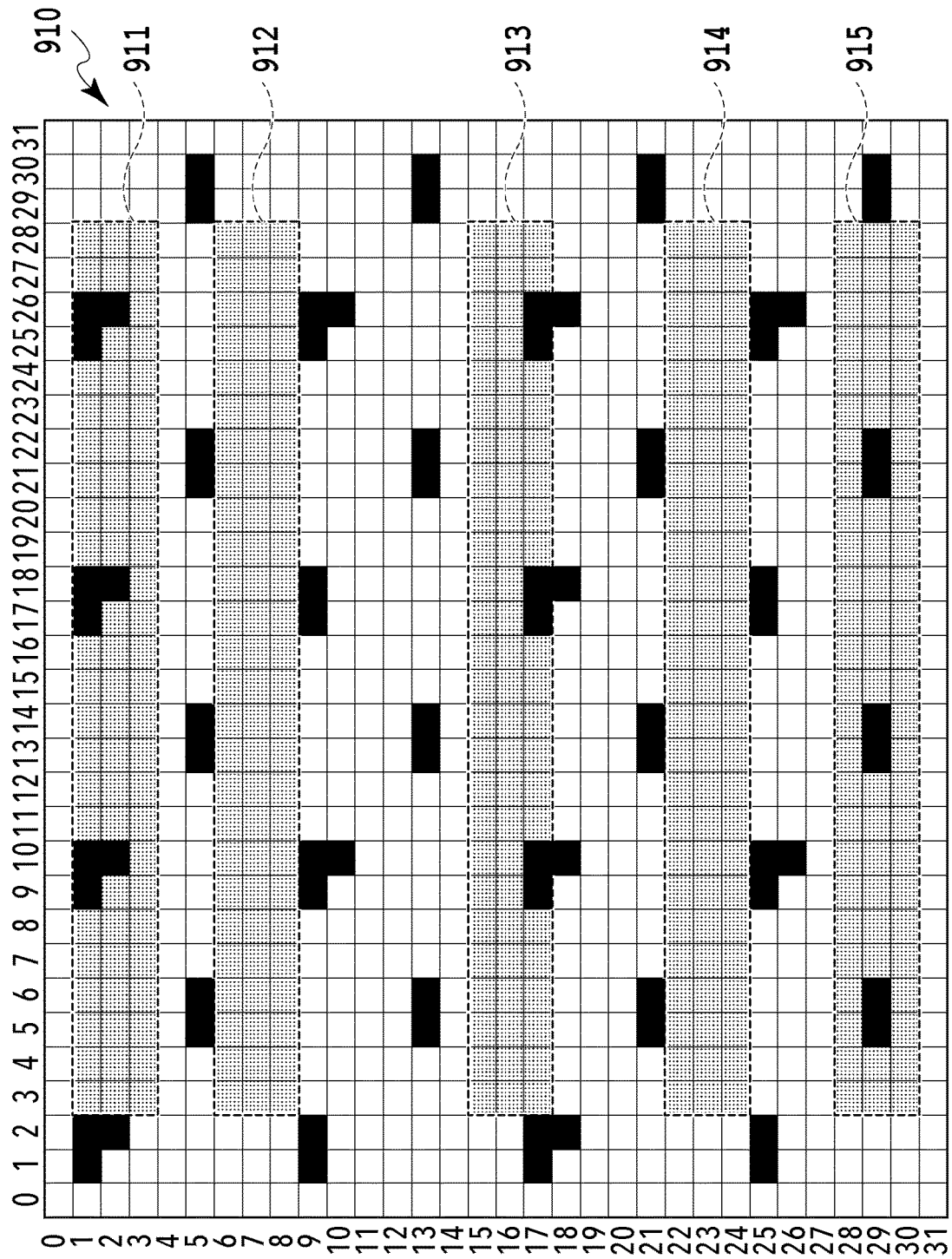
Figure 9C:
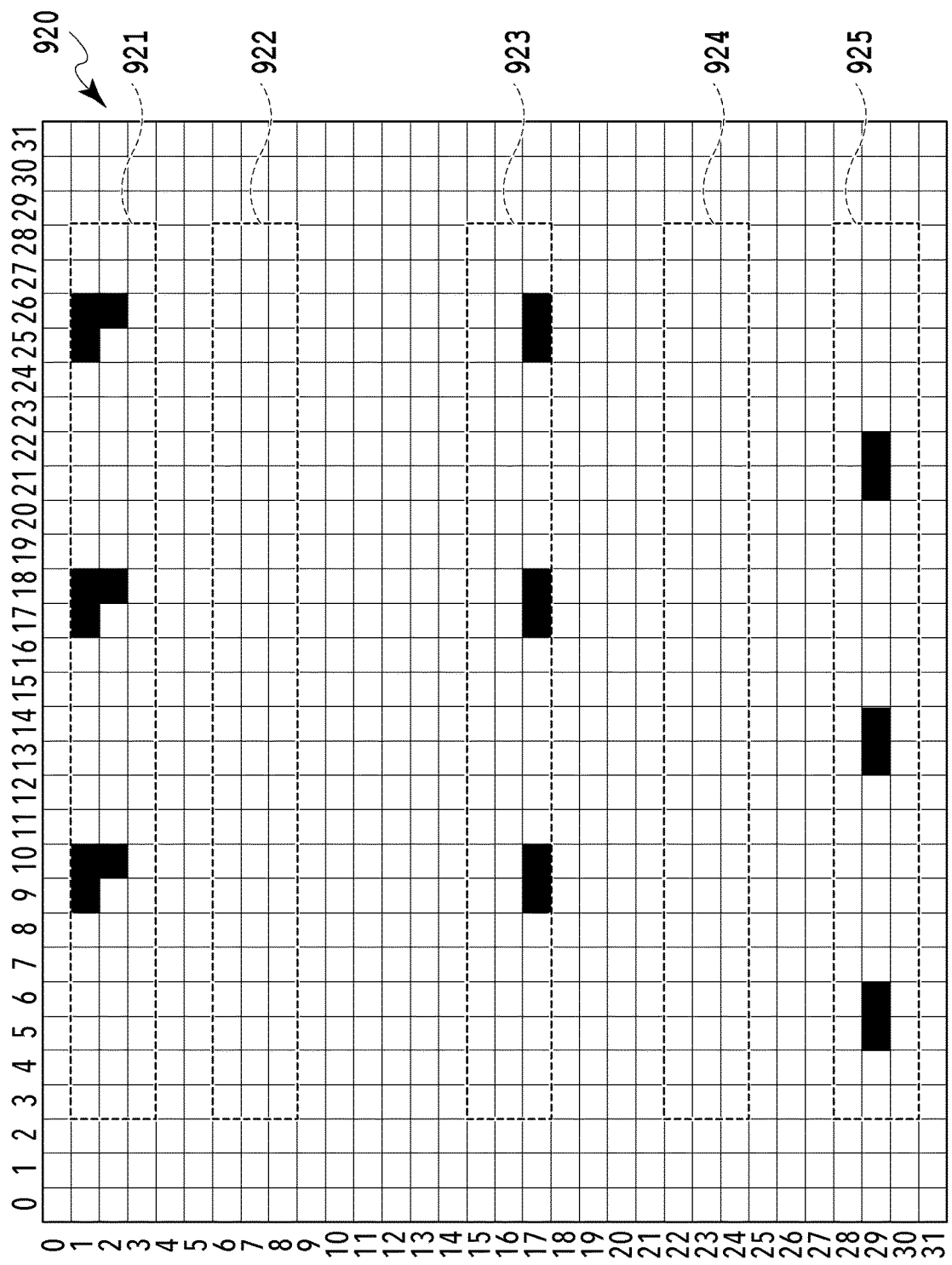

Next, by using FIG. 9A to FIG. 9C, the case where a yellow thin line having a width of three pixels is printed by a monochrome printer is explained. FIG. 9A shows image data 900 including yellow thin lines having a width of three pixels. In the image data 900, a plurality of thin lines 901 to 905 is arranged at positions different from one another and each thin line is a yellow color. As described previously, in the monochrome printer, the yellow color signal (R=255, G=255, B=0) is converted into the value (19) of K. Consequently, the pixel value of each thin line after gray conversion and luminance/density conversion is 19.

FIG. 9B is a diagram showing the way the dot patterns obtained by the pseudo halftone processing using the general dither matrix 702 and the image data of the yellow thin lines are superimposed. The configuration of the dot patterns obtained by the pseudo halftone processing using the general dither matrix 720 is as the binary bitmap 802 shown in FIG. 8B. Here, in the case where the image data 900 is superimposed on the binary bitmap 802 so that each of the positions of the yellow thin lines 901 to 905 is located at the corresponding position of the binary bitmap 802, a bitmap 910 as shown in FIG. 9B is obtained. Areas 911 to 915 in the bitmap 910 indicate areas corresponding to the thin lines 901 to 905, respectively, and the dot patterns belonging to the areas 911 to 915 are drawn as the dot patterns of the thin lines. Because of this, at the time of printing the yellow thin lines 901 to 905 having a width of three pixels by a monochrome printer, in the case where the general dither matrix 702 is used for the pseudo halftone processing, a binary bitmap 920 as shown in FIG. 9C is generated.

As shown in FIG. 9B, in the areas 911, 913, and 915 corresponding to the thin lines 901, 903, and 905, respectively, dot patterns exist. Consequently, for the thin lines 901, 903, and 905, dot patterns are drawn in corresponding areas 921, 923, and 925 in FIG. 9C. On the other hand, as shown in FIG. 9B, in the areas 912 and 914 corresponding to the thin lines 902 and 904, respectively, no dot pattern exists. Because of this, for the thin lines 902 and 904, no dot pattern is drawn in corresponding areas 922 and 924 in FIG. 9C. Consequently, the thin lines 902 and 904 disappear.

As described above, in the pseudo halftone processing by the dither method using the general dither matrix 720, there is a case where a thin line whose density is low, such as yellow, disappears depending on the drawing position as shown in FIG. 9C.

[Configuration of Dither Matrix of Different Direction Growth]

Figure 10:
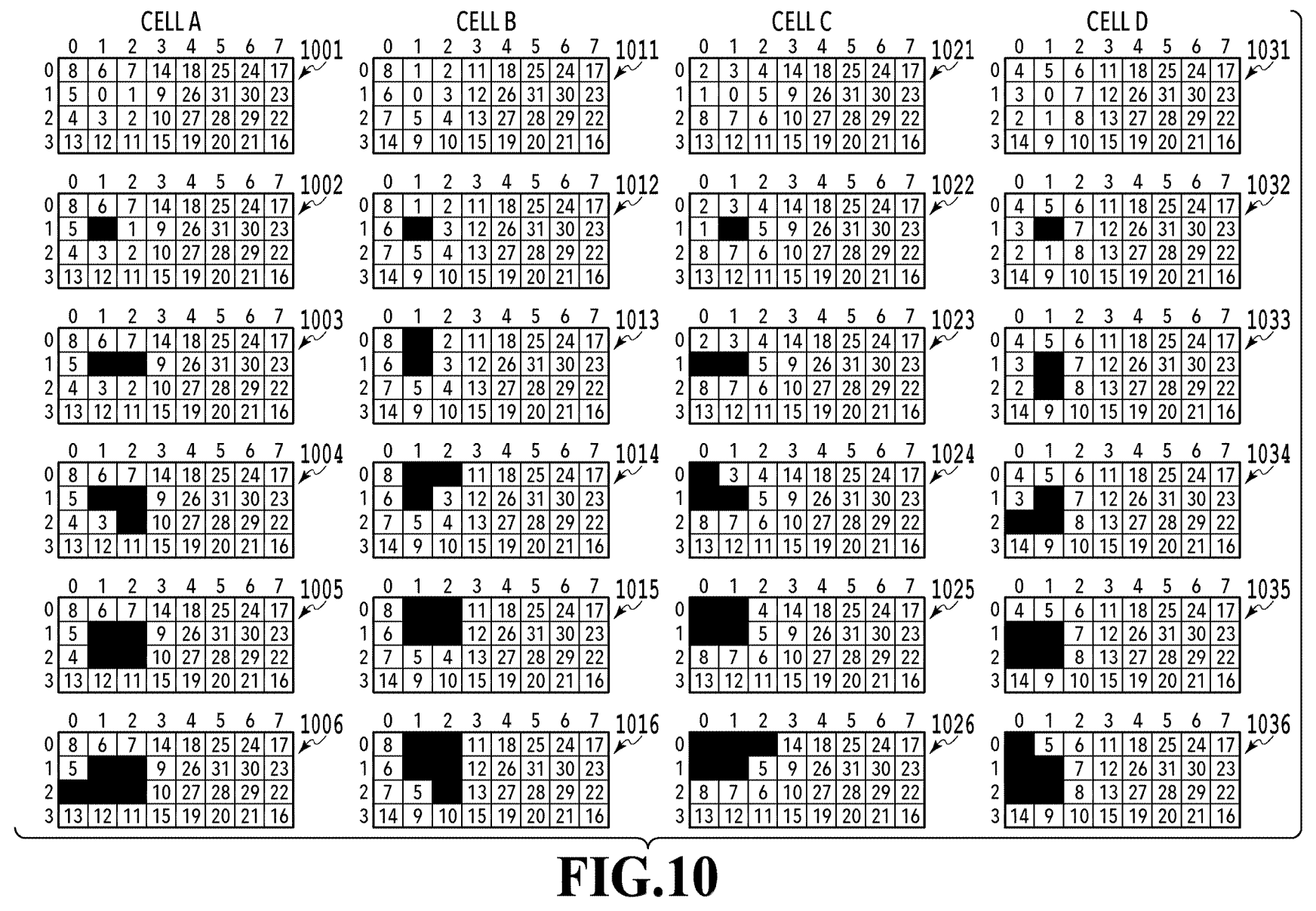
Figure 11:
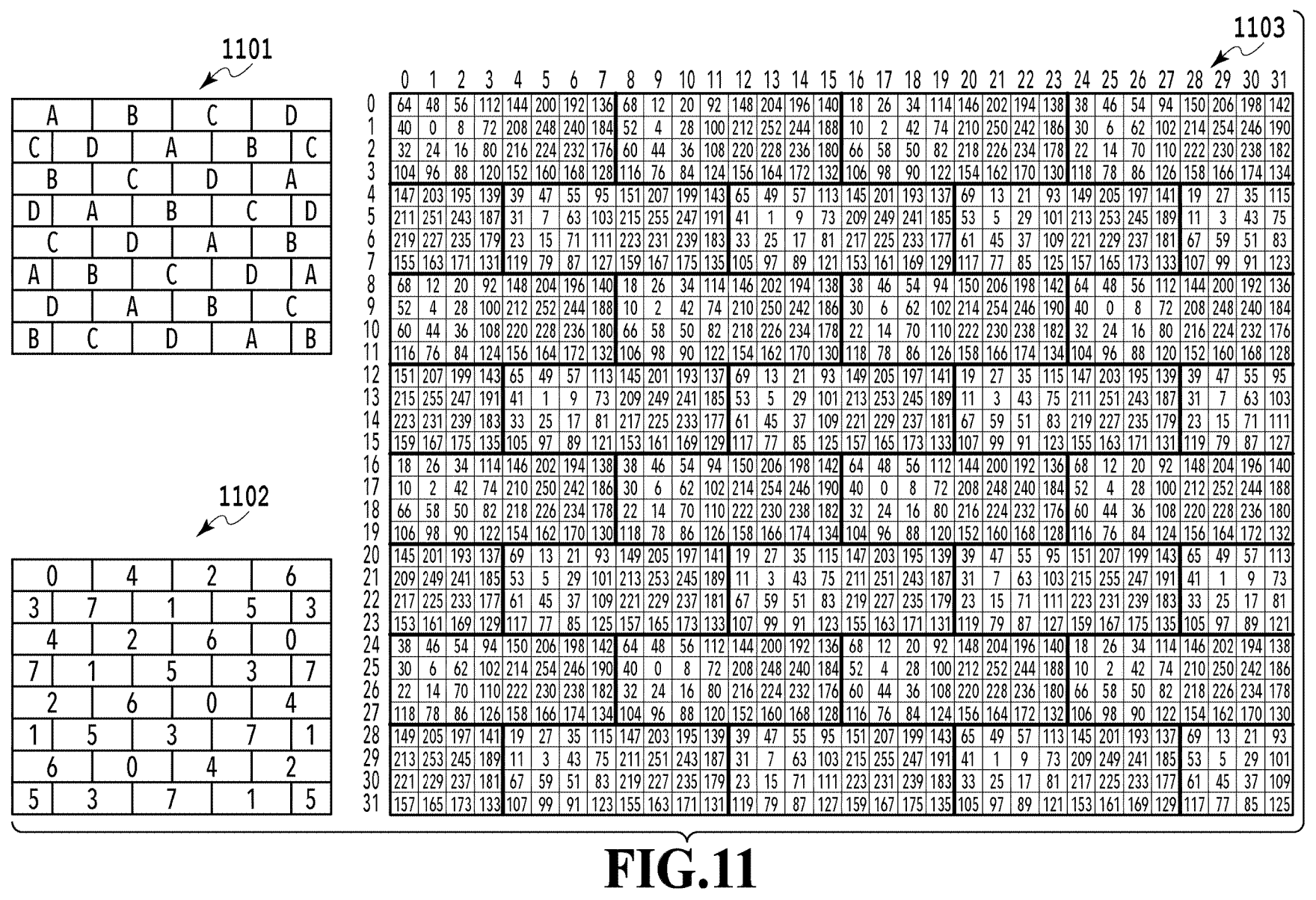

Next, by using FIG. 10 and FIG. 11, the configuration of the dither matrix according to the first embodiment is explained in detail. In the present embodiment, in order to suppress the disappearance of a thin line and the like whose density is low in the pseudo halftone processing, a dither matrix made up of cells in which a dot pattern is caused to grow in different directions is used (hereinafter, sometimes called dither matrix of different direction growth).

The dither matrix of different direction growth is made up by combining four cells whose dot lighting order is different from one another in order to cause the dot pattern to grow in four direction, that is, the upward, downward, leftward, and rightward directions. FIG. 10 is a diagram for explaining cells making up a dither matrix of different direction growth according to the first embodiment. Each of four cells 1001, 1011, 1021, and 1031 whose lighting order is different from one another is an N×M matrix and a value (threshold value) indicating the order of lighting a dot is set to each element. In FIG. 10, cells of a dither matrix of different direction growth whose screen angle is 45 degrees and whose screen ruling is 106 lines are illustrated. As shown in the cells 1001, 1011, 1021, and 1031, the start position (start point) at which the dot is lit first is set to the same phase. That is, the start point of the four cells 1001, 1011, 1021, and 1031 is the same and lighting of a dot is started from a position (1, 1). However, the position of the dot that is lit second is different for each of the four cells. In the present embodiment, hereinafter, the cell in which the second dot is lit in the rightward direction of the start point is called a cell of A type or a cell A. The cell in which the second dot is lit in the upward direction of the start point is called a cell of B type or a cell B. The cell in which the second dot is lit in the leftward direction of the start point is called a cell of C type or a cell C. The cell in which the second dot is lit in the downward direction of the start point is called a cell of D type or a cell D.

Cells 1002 to 1006 shown in FIG. 10 indicate a formation process of a dot pattern of the cell A. In the cell A, the dot is lit at the position (1, 1) first and following this, the dot is lit at a position (2, 1) in the rightward direction thereof. After this, with the position (1, 1) as a reference, dots are lit sequentially in the clockwise direction.

Cells 1012 to 1016 indicate a formation process of a dot pattern of the cell B. As in the case with the cell A, in the cell B, the dot at the position (1, 1) is lit first. However, in the cell B, the position of the dot that is lit second is different from the position in the cell A and the second dot is lit at a position (1, 0) in the upward direction of the start point. After this, with the position (1, 1) as a reference, dots are lit sequentially in the clockwise direction.

Cells 1022 to 1026 indicate a formation process of a dot pattern of the cell C. As in the case with the cells A and B, in the cell C, the dot at the position (1, 1) is lit first. However, in the cell C, the position of the dot that is lit second is different from the positions in the cells A and B and the second dot is lit at a position (0, 1) in the leftward direction of the start point. After this, with the position (1, 1) as a reference, dots are lit sequentially in the clockwise direction.

Cells 1032 to 1036 indicate a formation process of a dot pattern of the cell D. As in the case with the cells A, B, and C, in the cell D, the dot at the position (1, 1) is lit first. However, in the cell D, the position of the dot that is lit second is different from the positions in the cells A, B, and C and the second dot is lit at a position (1, 2) in the downward direction of the start point. After this, with the position (1, 1) as a reference, dots are lit sequentially in the clockwise direction.

In this manner, in the present embodiment, in each of the cell A, the cell B, the cell C, and the cell D, a dot pattern is formed by sequentially lighting dots in directions different from one another. In particular, the position within the cell, at which the dot is lit second, is made different between adjacent cells and then in each cell, with the start point as a reference, a dot pattern is caused to grow in the clockwise direction. Due to this, for example, a dot pattern whose height is two dots is formed in the range of three dots as in the cells 1004, 1014, 1024, and 1034 shown in FIG. 10, and therefore, drawing incomplete and drawing omission of a thin line or character are made unlikely to occur. In FIG. 10, examples in which dots are lit in the clockwise direction in each cell are shown, but the direction at the time of sequentially lighting dots may be, for example, the counterclockwise direction.

FIG. 11 is a diagram showing an example of a configuration of the dither matrix of different direction growth according to the first embodiment. In FIG. 11, an arrangement example and a lighting order of the cells A, B, C, and D in the dither matrix of different direction growth according to the first embodiment are shown, respectively. A dither matrix 1101 represents the dither matrix of different direction growth according to the present embodiment in units of cells. A dither matrix 1102 represents the lighting order of cells of the dither matrix 1101 and the value within each cell indicates the lighting order. In the present embodiment, as shown in the dither matrix 1101, the cells A, B, C, and D are arranged by shifting the cells A, B, C, and D so that the growth directions of adjacent cells are different from one another. Further, in the present embodiment, as shown in the dither matrix 1102, the lighting order of the 32 cells arranged in the dither matrix is set. Due to this, a dither matrix 1103 of a 32×32 size having threshold values capable of representing 256 tone levels is generated. The dither matrix 1103 represents the dither matrix 1101 in units of elements. In this manner, the dither matrix of different direction growth that suppresses the disappearance of a thin line and the like whose density is low is generated.

[Generation of Binary Bitmap by Dither Matrix of Different Direction Growth]

Figure 12A:
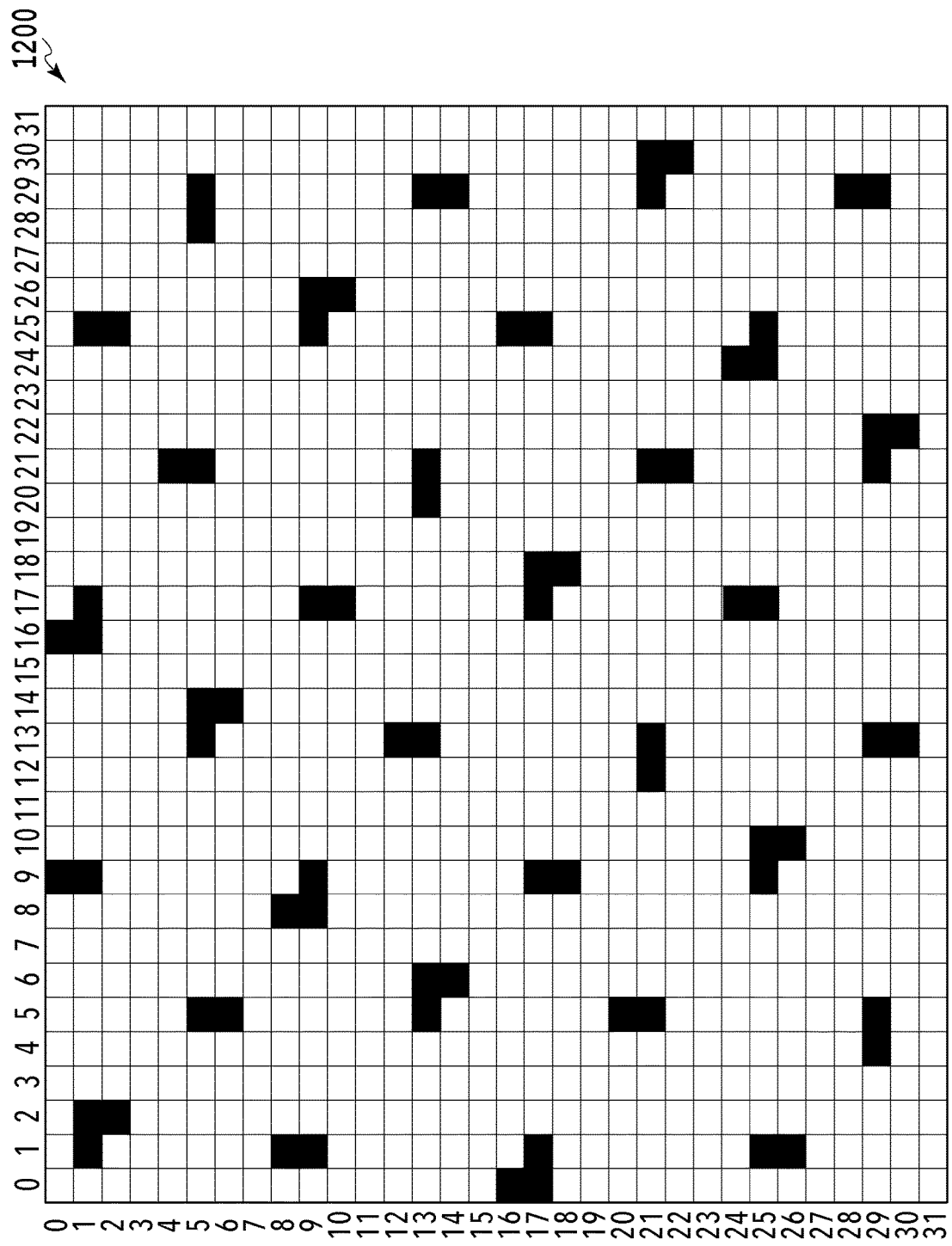
FIG. 12A to FIG. 12C are diagrams for explaining pseudo halftone processing using the dither matrix of different direction growth according to the first embodiment.
Figure 12B:
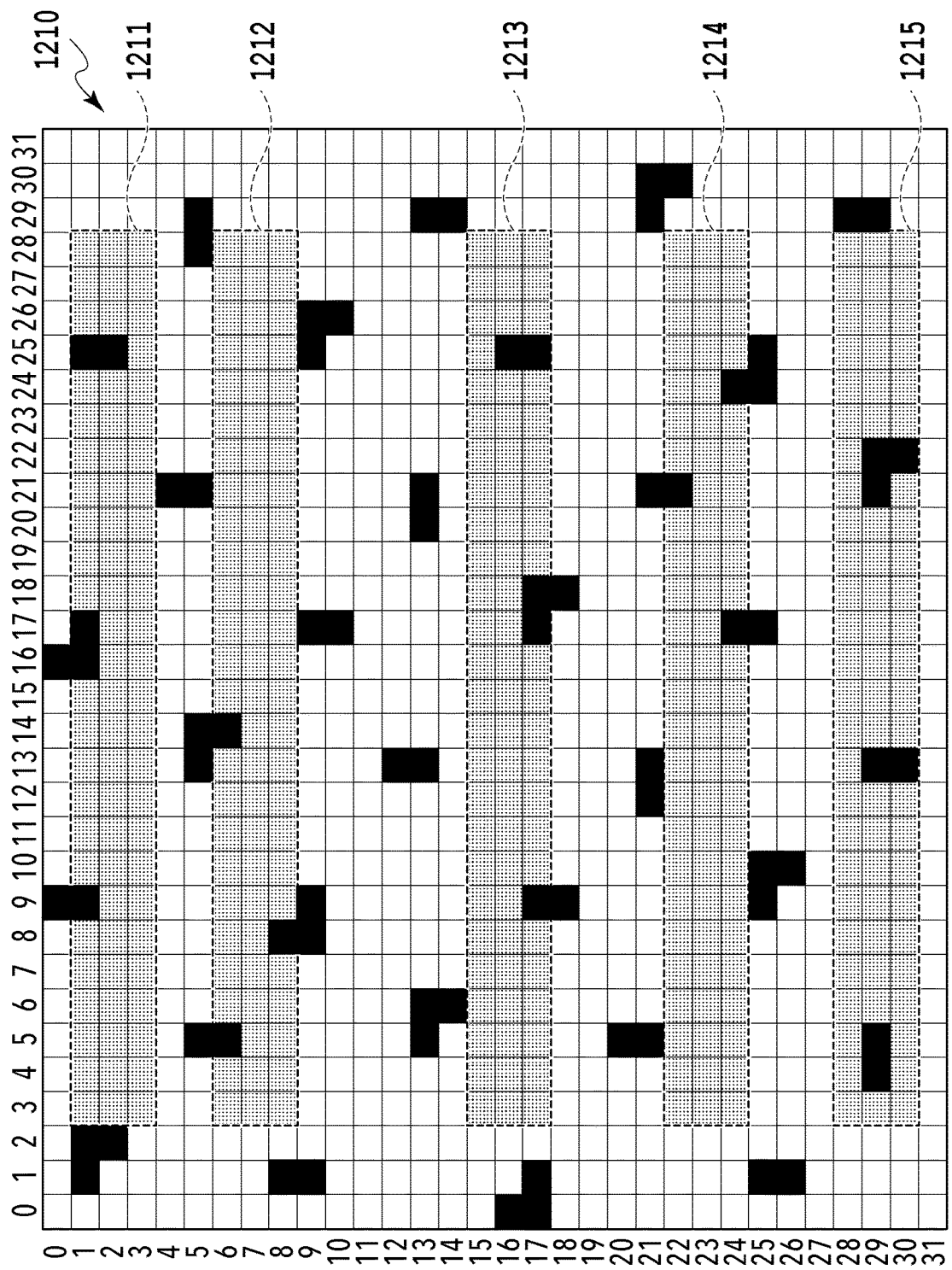
Figure 12C:
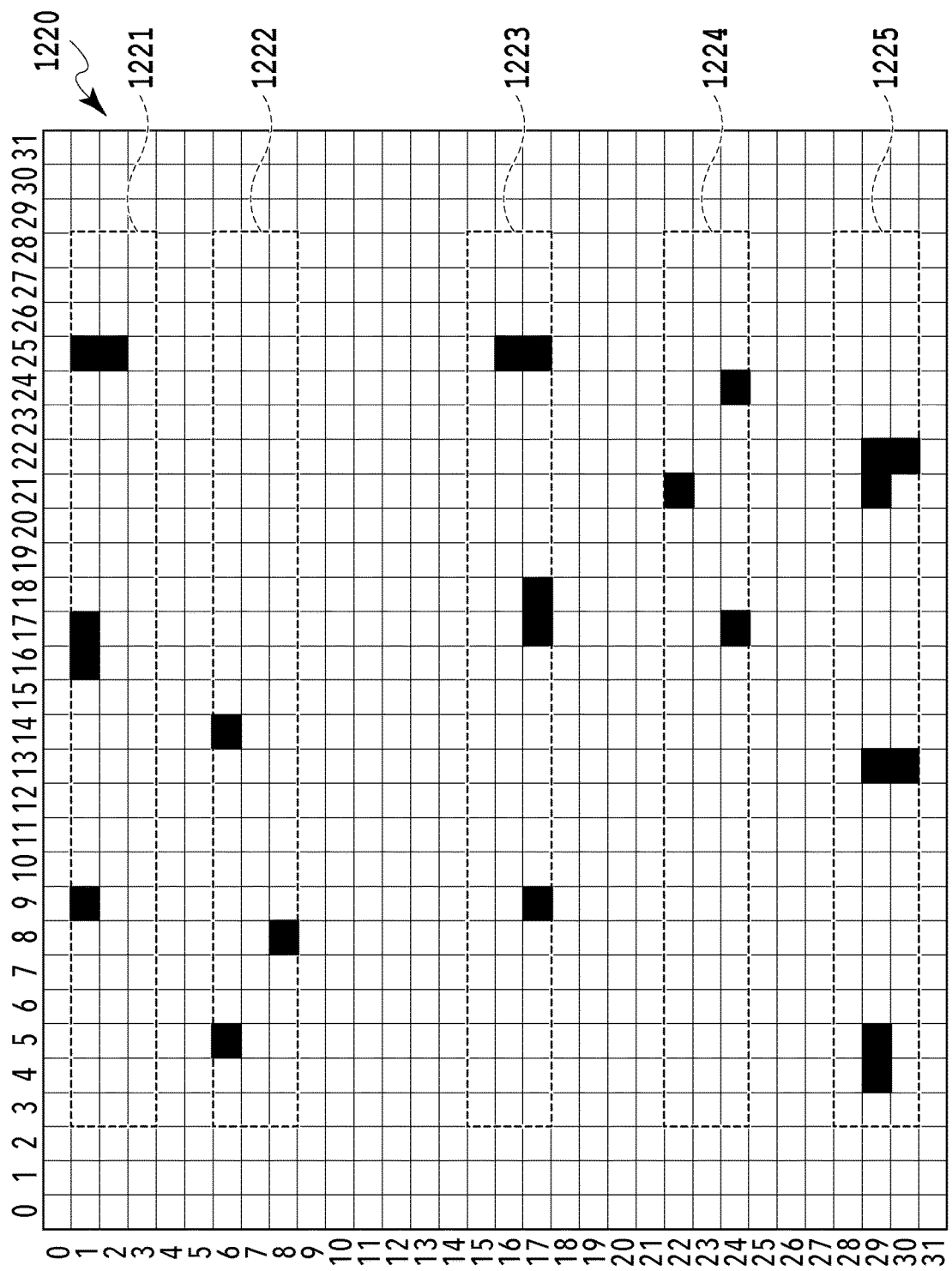

Next, by using FIG. 12A to FIG. 12C, generation of a binary bitmap by the pseudo halftone processing using the dither matrix of different direction growth according to the first embodiment is explained. Here, the case where the graphics shown in FIG. 8A, whose color signals of all pixels are yellow (R=255, G=255, B=0), is printed by a monochrome printer is explained.

FIG. 12A shows a binary bitmap 1200 obtained by performing pseudo halftone processing for the image data 801 by using the dither matrix 1103. As in the case with the dither matrix 702 described previously, the dither matrix 1103 is arranged for the image data 801 so that a top position (0, 0) of the dither matrix 1103 is located at the top position (0, 0) of the image data 801. Then, the threshold value corresponding to each pixel of the image data 801 is read from the dither matrix 1103 and the pixel value of each pixel and the threshold value corresponding to each pixel are compared. Then, of each of the pixels of the image data 801, to a pixel whose pixel value is larger than the threshold value, 1 (black) is set and to the other pixels, 0 (white) is set. By performing the pseudo halftone processing such as this for all the pixels of the image data 801, the binary bitmap 1200 shown in FIG. 12A is generated. In the case where the size of the image data 801 is larger than the size of the dither matrix 1103, as described previously, the dither matrix is arranged repeatedly in accordance with the size of the image data.

The binary bitmap 1200 obtained by the pseudo halftone processing using the dither matrix 1103 of different direction growth is made up of two-pixel or three-pixel dot patterns as in the case with the binary bitmap 802 shown in FIG. 8B. However, different from the binary bitmap 802 shown in FIG. 8B, in the binary bitmap 1200, the directions (orientations) of dot patterns of adjacent cells are different from each other.

Next, the case where the image data 900 including the yellow thin lines having a width of three pixels shown in FIG. 9A is printed by performing the pseudo halftone processing by the dither matrix 1103 of different direction growth is explained. As described previously, in the image data 900 shown in FIG. 9A, the plurality of the thin lines 901 to 905 is arranged at the positions different from one another and each thin line is a yellow color. Consequently, in the case where the gray conversion and the luminance/density conversion described previously are performed, the pixel value of each thin line becomes 19.

FIG. 12B is a diagram showing the way the dot patterns (dot patterns of the binary bitmap 1200) obtained by the pseudo halftone processing using the dither matrix 1103 of different direction growth and the image data of the yellow thin lines are superimposed. In the case where the image data 900 is superimposed on the binary bitmap 1200 so that each of the positions of the yellow thin lines 901 to 905 is located at the corresponding position of the binary bitmap 1200, a bitmap 1210 as shown in FIG. 12B is obtained. Areas 1211 to 1215 in the bitmap 1210 indicate the areas corresponding to the thin lines 901 to 905 and dot patterns are included in all the areas. Consequently, in the case where the dither matrix 1103 of different direction growth is used for the pseudo halftone processing, it is possible to obtain a binary bitmap 1220 in which dot patterns are drawn in all areas 1221 to 1225 corresponding to the thin lines 901 to 905 as shown in FIG. 12C.

As explained above, in the present embodiment, in each cell of the dither matrix, the second smallest threshold value within the cell is arranged at a position of one of eight neighborhoods adjacent to the position at which the smallest threshold value is arranged. Further, the position at which the second smallest threshold value within the cell is arranged is made to differ between adjacent cells. That is, in the present embodiment, threshold values are arranged in each cell of the dither matrix so that the direction in which the dot pattern is formed is made to differ between adjacent cells. Due to this, even in the case where the screen ruling of the dither matrix is reduced (for example, 106 lines) in order to output the density stably, it is possible to make conventional drawing failure (drawing incomplete and drawing omission of a low-density thin line and the like shown in FIG. 9C) unlikely to occur. That is, by using the dither matrix of different direction growth according to the present embodiment in the pseudo halftone processing, it is made possible to suppress drawing failure of a low-density thin line or character (in particular, a small point character having an area whose width is narrow). Further, in the present embodiment, the start point at which the dot is lit first within each cell (cells A to D) is arranged in the same phase. Due to this, a moire resulting from a shift in position of dot patterns is made unlikely to occur.

Further, in the present embodiment, after the dot pattern grows up to the 4×4 size, that is, after it becomes unnecessary to take into consideration the disappearance of a thin line and the like, the dot is lit in the same direction in each cell. By the processing such as this, in the process in which the dot pattern grows up from the 4×4 size to the 8×4 size, the occurrence of moire resulting from a shift in position of dot patterns is suppressed.

Second Embodiment

In the first embodiment, the dither matrix of different direction growth (first dither matrix of different direction growth) made up of cells in which a dot pattern is caused to grow in the four directions, that is, in the upward, downward, leftward, and rightward directions is explained. However, the direction in which a dot pattern is caused to grow may be a direction other than the upward, downward, leftward, and rightward directions. Consequently, in the second embodiment, a dither matrix of different direction growth (second dither matrix of different direction growth) in which a dot pattern is caused to grow in a diagonal direction is explained.

[Configuration of Second Dither Matrix of Different Direction Growth]

Figure 13:
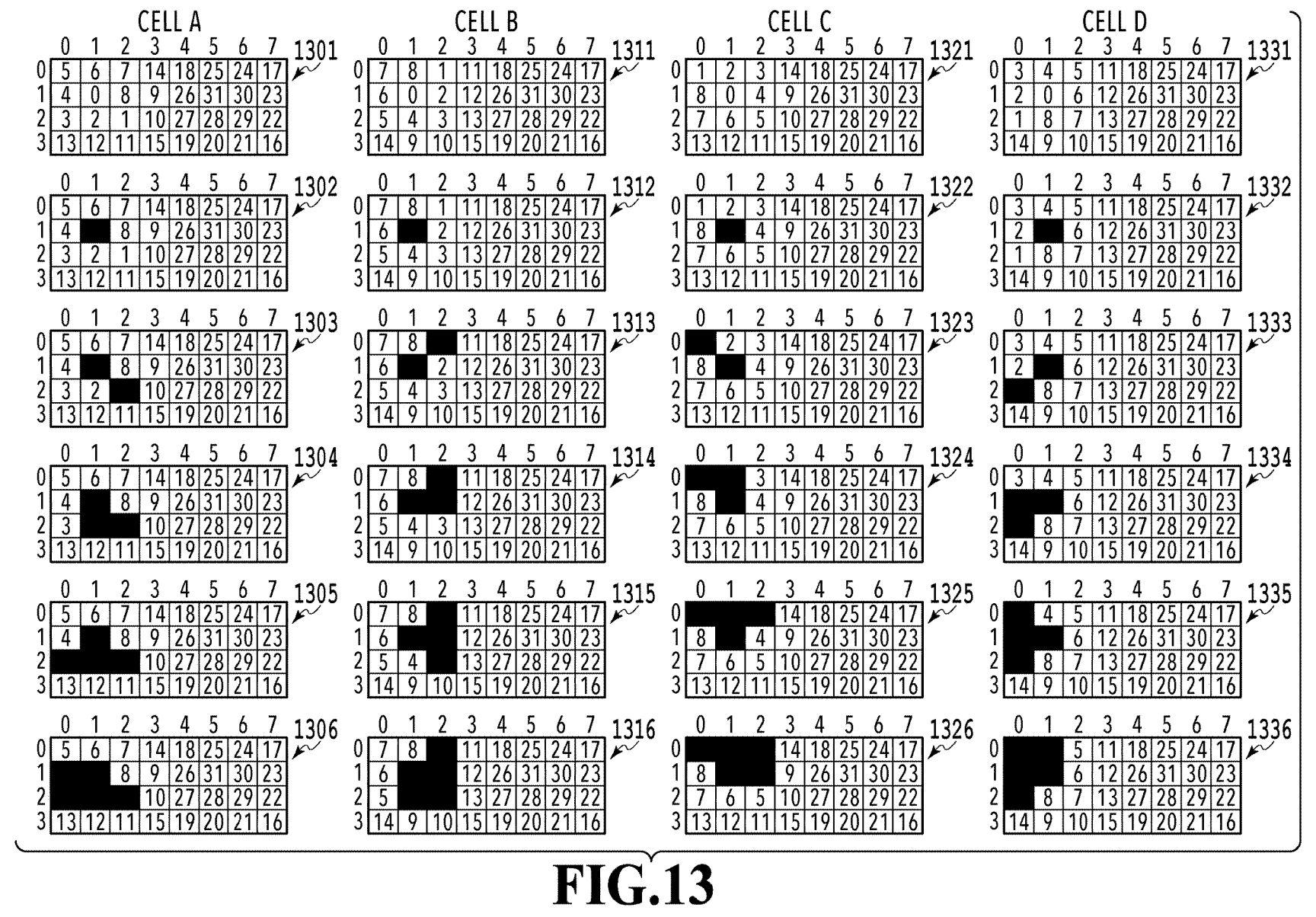

The dither matrix of different direction growth according to the present embodiment is made up by combining four cells whose lighting order of dots is different from one anther so that a dot pattern is caused to grown in the four directions, that is, in the diagonally downward to the right, diagonally upward to the right, diagonally upward to the left, and diagonally downward to the left directions. FIG. 13 is a diagram for explaining cells making up the dither matrix of different direction growth according to the second embodiment. Each of four cells 1301, 1311, 1321, and 1331 different in lighting order is an N×M matrix and as in the case with the first embodiment, to each element, a value (threshold value) indicating lighting order of dots is set. Further, as in the case with the first embodiment, the start point at which the dot is lit first is set to the same phase in the four cells. Furthermore, as in the case with the first embodiment, the position at which the dot is lit second is made to differ in the four cells. However, in the present embodiment, the second dot is lit in the diagonally downward to the right, diagonally upward to the right, diagonally upward to the left, and diagonally downward to the left directions of the start point, in place of the upward, downward, leftward, and rightward directions of the start point.

In the present embodiment, hereinafter, the cell in which the second dot is lit in the diagonally downward to the right direction of the start point is called a cell of A type or a cell A. The cell in which the second dot is lit in the diagonally upward to the right direction of the start point is called a cell of B type or a cell B. The cell in which the second dot is lit in the diagonally upward to the left direction of the start point is called a cell of C type or a cell C. The cell in which the second dot is lit in the diagonally downward to the left direction of the start point is called a cell of D type or a cell D.

Cells 1302 to 1306 shown in FIG. 13 show a formation process of a dot pattern of the cell A. In the cell A, the dot at a position (1, 1) is lit first and following this, a position (2, 2) in the diagonally downward to the right direction thereof is lit. After this, with the position (1, 1) as a reference, dots are lit sequentially in the clockwise direction.

Cells 1312 to 1316 show a formation process of a dot pattern of the cell B. In the cell B, as in the case with the cell A, the dot at the position (1, 1) is lit first. However, in the cell B, the position of the dot that is lit second is different from that of the cell A and a position (2, 0) in the diagonally upward to the right direction of the start point is lit. After this, with the position (1, 1) as a reference, dots are lit sequentially in the clockwise direction.

Cells 1322 to 1326 show a formation process of a dot pattern of the cell C. In the cell C, as in the case with the cells A and B, the dot at the position (1, 1) is lit first. However, in the cell C, the position of the dot that is lit second is different from those of the cells A and B and a position (0, 0) in the diagonally upward to the left direction of the start point is lit. After this, with the position (1, 1) as a reference, dots are lit sequentially in the clockwise direction.

Cells 1332 to 1336 show a formation process of a dot pattern of the cell D. In the cell D, as in the case with the cells A, B, and C, the dot at the position (1, 1) is lit first. However, in the cell D, different from those of the cells A, B, and C, a position (0, 2) in the diagonally downward to the left direction of the start point is lit. After this, with the position (1, 1) as a reference, dots are lit sequentially in the clockwise direction. As described above, in each cell of the cell A, the cell B, the cell C, and the cell D, a dot pattern is formed by sequentially lighting dots in the directions different from one another.

Figure 14:
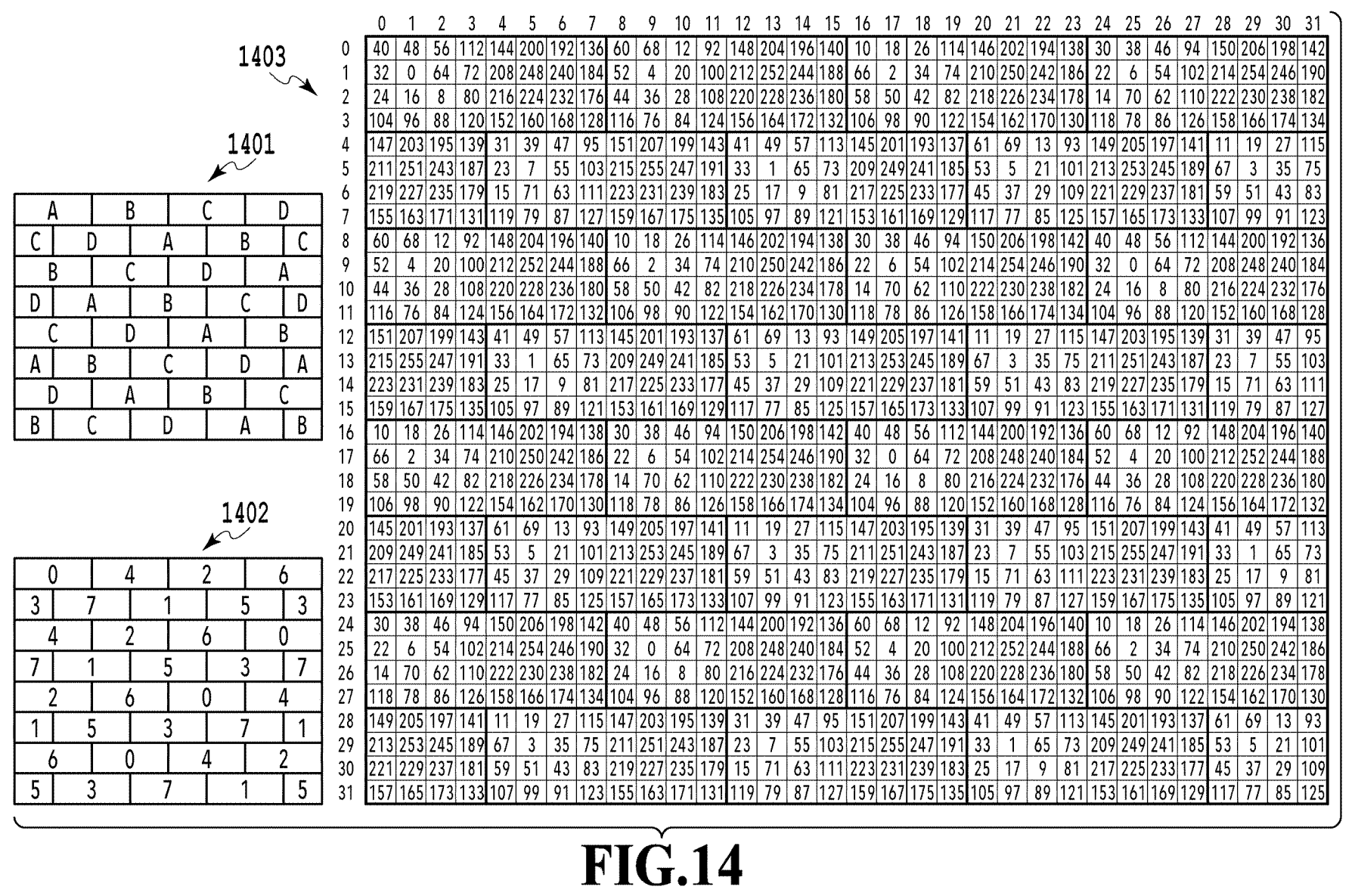

FIG. 14 is a diagram showing an example of the configuration of the dither matrix of different direction growth according to the second embodiment. In FIG. 14, an arrangement example and a lighting order of the cells A, B, C, and D in the dither matrix of different direction growth according to the second embodiment are shown, respectively. A dither matrix 1401 shows the dither matrix of different direction growth according to the present embodiment in units of cells. A dither matrix 1402 shows the lighting order of the cells of the dither matrix 1401 and the value within each cell indicates the lighting order. The arrangement method of the cells in the present embodiment is the same as in the first embodiment as shown in the dither matrix 1401. That is, in the present embodiment also, the cells are arranged while shifting the cells so that the growth directions of the dot patterns in adjacent cells are different from one another. Further, the lighting order of the 32 cells arranged in the dither matrix is also the same as in the first embodiment as shown in the dither matrix 1402. Due to this, a dither matrix 1403 of a 32×32 size, which has threshold values capable of representing 256 tone levels, is generated. The dither matrix 1403 shows the dither matrix 1401 in units of elements.

[Generation of Binary Bitmap by Second Dither Matrix of Different Direction Growth]

Figure 15A:
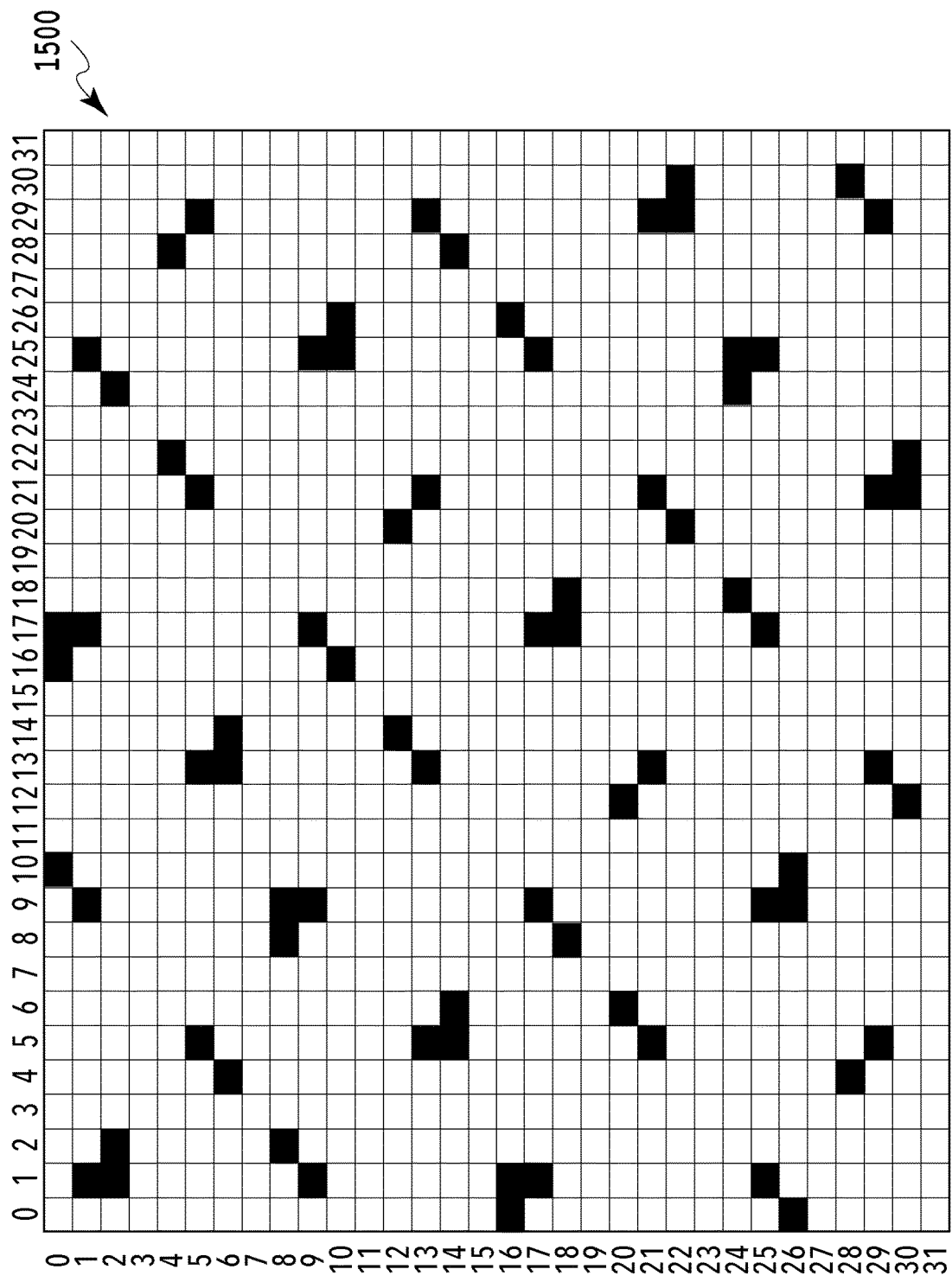
FIG. 15A to FIG. 15C are diagrams for explaining pseudo halftone processing using the dither matrix of different direction growth according to the second embodiment.
Figure 15B:
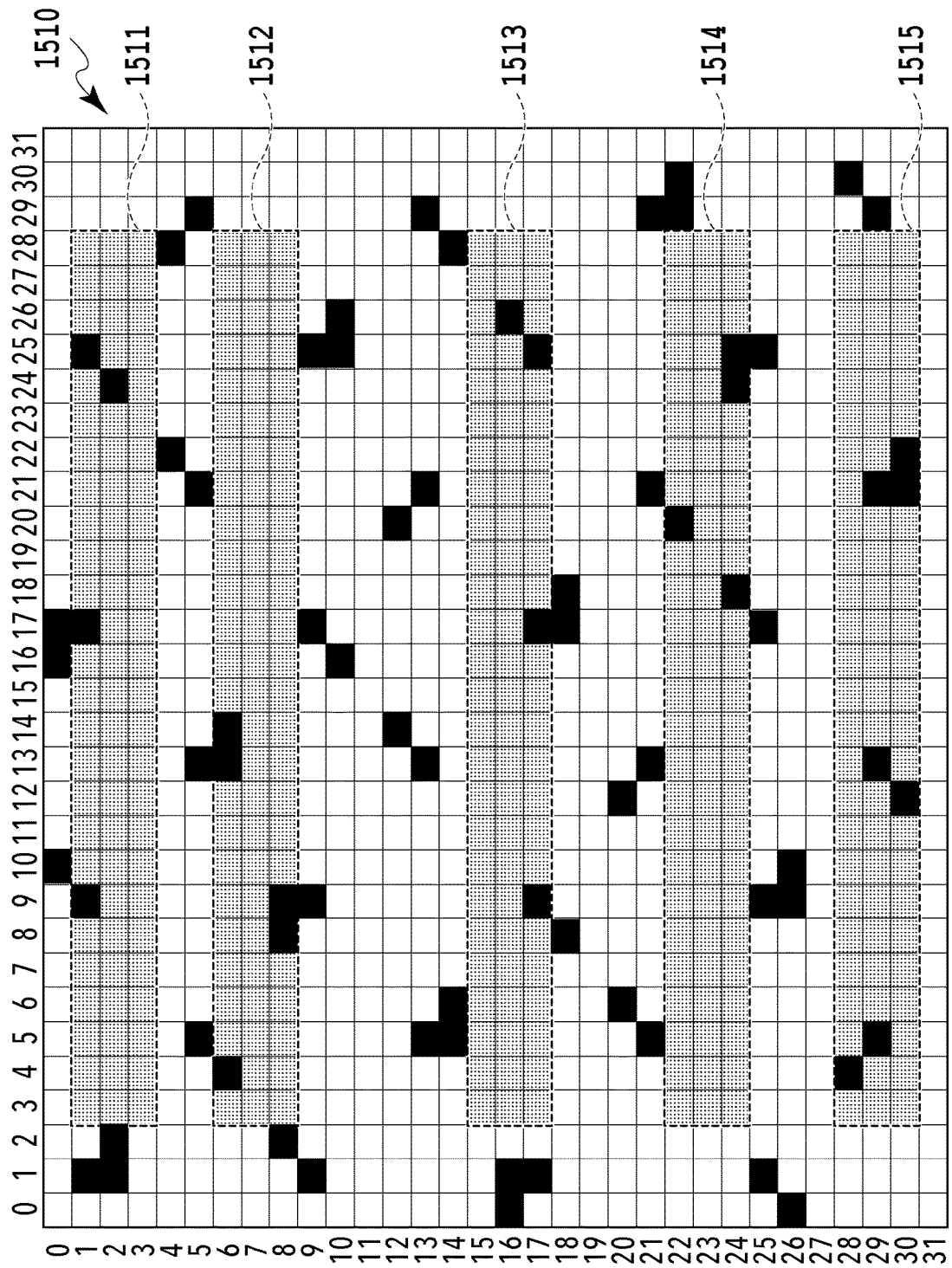
Figure 15C:
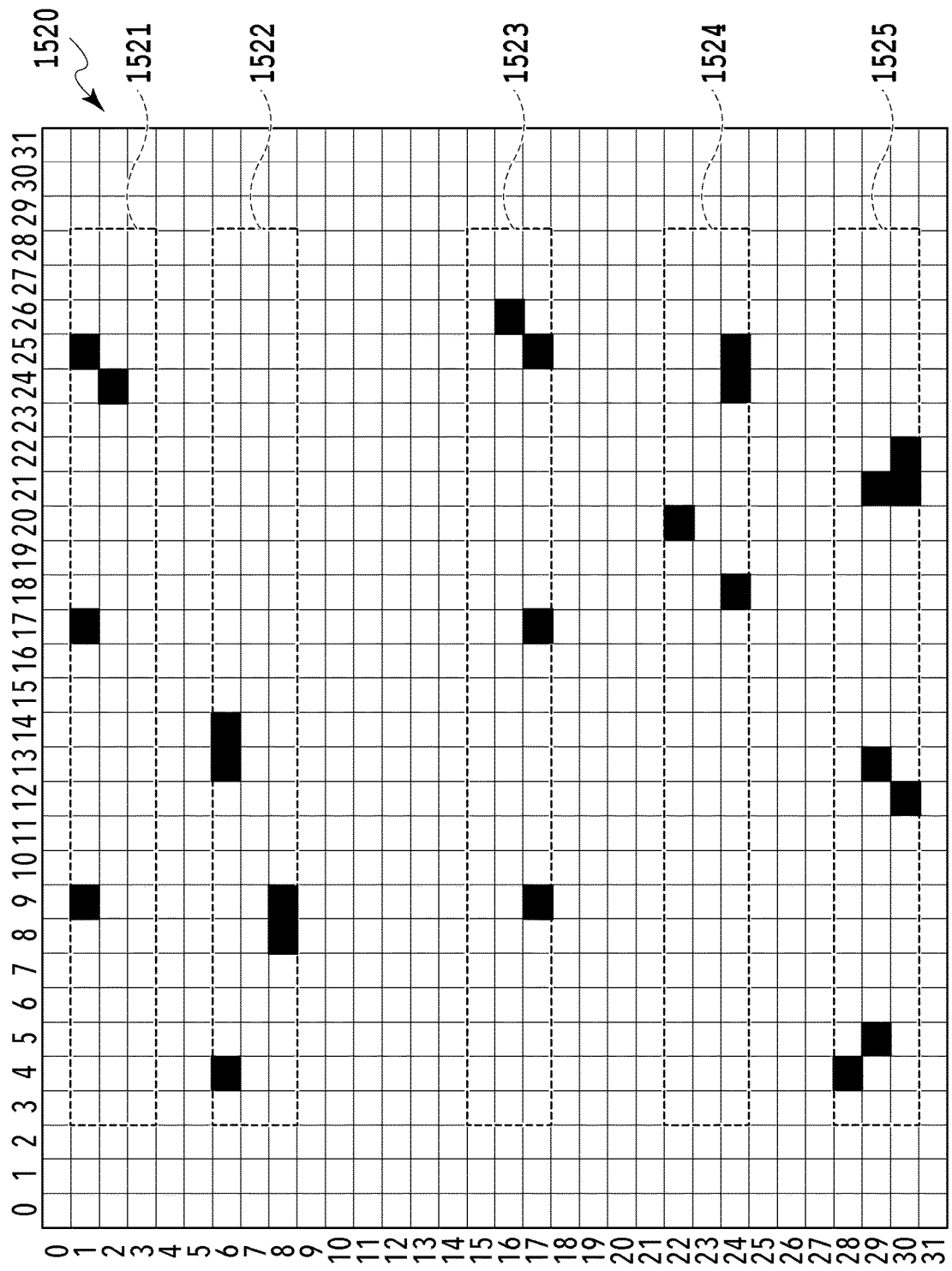

Next, by using FIG. 15A to FIG. 15C, generation of a binary bitmap by pseudo halftone processing using the dither matrix of different direction growth according to the second embodiment is explained. Here, the case where the graphics whose color signals of all the pixels are yellow (R=255, G=255, B=0) shown in FIG. 8A is printed by a monochrome printer is explained.

FIG. 15A shows a binary bitmap 1500 obtained by performing pseudo halftone processing for the image data 801 by using the dither matrix 1403. The dither matrix 1403 is arranged for the image data 801 so that a top position (0, 0) of the dither matrix 1403 is located at the top position (0, 0) of the image data 801. Then, the threshold value corresponding to each pixel of the image data 801 is read from the dither matrix 1403 and the pixel value of each pixel and the threshold value corresponding to each pixel are compared. Then, of each of the pixels of the image data 801, to a pixel whose pixel value is larger than the threshold value, 1 (black) is set and to the other pixels, 0 (white) is set. By performing the pseudo halftone processing such as this for all the pixels of the image data 801, the binary bitmap 1500 shown in FIG. 15A is generated. In the case where the size of the image data 801 is larger than the size of the dither matrix 1403, the dither matrix is arranged repeatedly in accordance with the size of the image data as described previously.

The binary bitmap 1500 obtained by the pseudo halftone processing using the dither matrix 1403 of different direction growth is made up of two-pixel or three-pixel dot patterns as in the binary bitmap 802 shown in FIG. 8B. However, different from the binary bitmap 802, the directions of dot patterns of adjacent cells are different from each other.

Next, the case is explained where the image data 900 including the yellow thin lines having a width of three pixels shown in FIG. 9A is printed by performing the pseudo halftone processing by using the dither matrix 1403 of different direction growth. FIG. 15B is a diagram showing the way the dot patterns (dot patterns of the binary bitmap 1500) obtained by the pseudo halftone processing using the dither matrix 1403 of different direction growth and the image data of the yellow thin lines are superimposed. In the case where the image data 900 is superimposed on the binary bitmap 1500 so that each of the positions of the yellow thin lines 901 to 905 is located at the corresponding position of the binary bitmap 1500, a bitmap 1510 as shown in FIG. 15B is obtained. Areas 1511 to 1515 in the bitmap 1510 indicate the areas corresponding to the thin lines 901 to 905 and in FIG. 15B, dot patterns are included in all the areas. Consequently, in the case where the dither matrix 1403 of different direction growth is used for the pseudo halftone processing, as shown in FIG. 15C, it is possible to obtain a binary bitmap 1520 in which dot patterns are drawn in all areas 1521 to 1525 corresponding to the thin lines 901 to 905

As above, also by causing a dot pattern to grow in a direction from the start point other than the upward, downward, leftward, and rightward directions, it is possible to suppress drawing failure of a low-density thin line or character (in particular, a small point character having an area whose width is narrow) and to prevent deterioration in quality of a thin line or character as in the first embodiment.

Third Embodiment

In an image forming apparatus, density adjustment is performed in order to represent ideal gradation. The density adjustment is performed by correcting (converting) an input pixel value by using a density correction table so that the current density characteristic measured from the input pixel value becomes a target density characteristic.

However, in the above-described density adjustment, the input pixel value is corrected so that the target density characteristic is obtained. Because of this, in the case where the current density characteristic (output density characteristic of the image forming apparatus 101, which is measured from the input pixel value before correction) exhibits a density characteristic higher in density than the target density characteristic, the input pixel value after correction becomes smaller than the input pixel value before correction. Due to this, the number of lit pixels making up a dot pattern generated in dither processing becomes small. For example, in the case where 64 is set to the pixel value that can take a value in the range between 0 (white) and 255 (black), the dot pattern before correction is made up of lit pixels whose area ratio is 25%. At this time, it is assumed that the target density value of the pixel value 64, which is determined in advance, is set to 0.3. Further, in the case where the pixel value indicating a density value of 0.3 calculated from the current density characteristic obtained by actually performing measurement is 25, the input pixel value 64 is converted into the pixel value 25 by the density adjustment using a density correction table. Consequently, the dot pattern for the input pixel value 64 is made up of the lit pixels whose area ratio is 10%, which is the dot pattern corresponding to the pixel value 25.

In the case where an input pixel value is corrected to a lower pixel value as described above, the number of lit pixels becomes small for a low-density thin line or character (in particular, a small point character having an area whose width is narrow), and therefore, no dot pattern exists depending on the drawing position. Because of this, there is a possibility that drawing incomplete or drawing omission as described above occurs for such a thin line or character. Consequently, the dither matrix of different direction growth according to the first and second embodiments is effective also for the image data after density adjustment.

On the other hand, in the case where an input pixel value is corrected to a higher pixel value, the number of lit pixels becomes large, and therefore, the above-described drawing incomplete and drawing omission are made unlikely to occur. Further, in a dither matrix of different direction growth, in which a dot pattern is caused to grow in a different direction, there is a case where some moire resulting from a shift in position of dot patterns occurs. For example, in the case where a dot pattern of the same shape, such as the cells 1005, 1015, 1025, and 1035 shown in FIG. 10, is arranged in each cell at a position slightly shifted from one another, some moire (moire to the extent that does not bring any problem of quality) occurs. Consequently, in the present embodiment, pseudo halftone processing that suppresses the occurrence of some moire as described above by switching between a dither matrix of different direction growth and a general dither matrix in accordance with the current density characteristic is explained.

[Density Correction Table Generation Processing]

Figure 16:
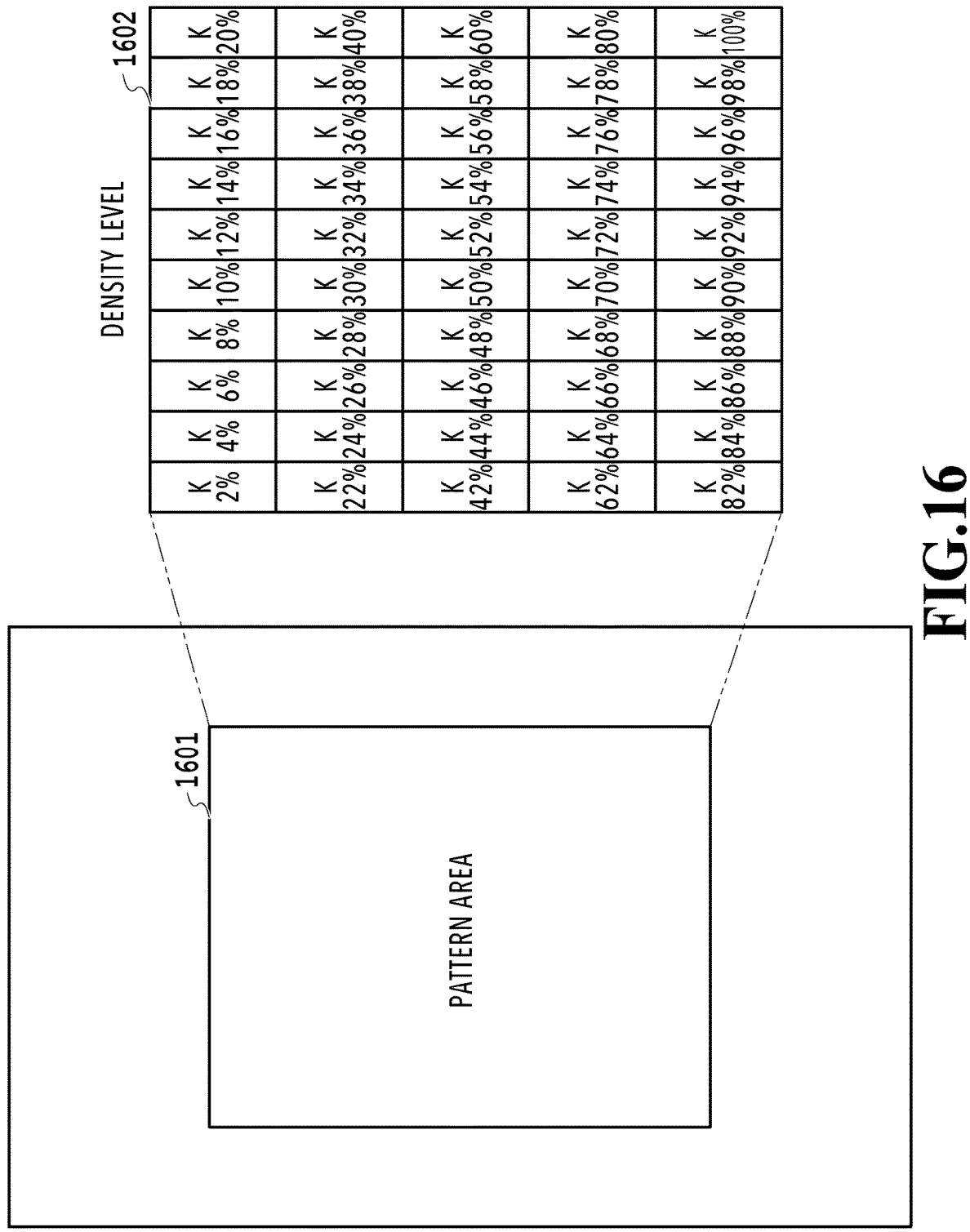
FIG. 16 is a diagram showing an example of a density correction test chart.
Figure 17:
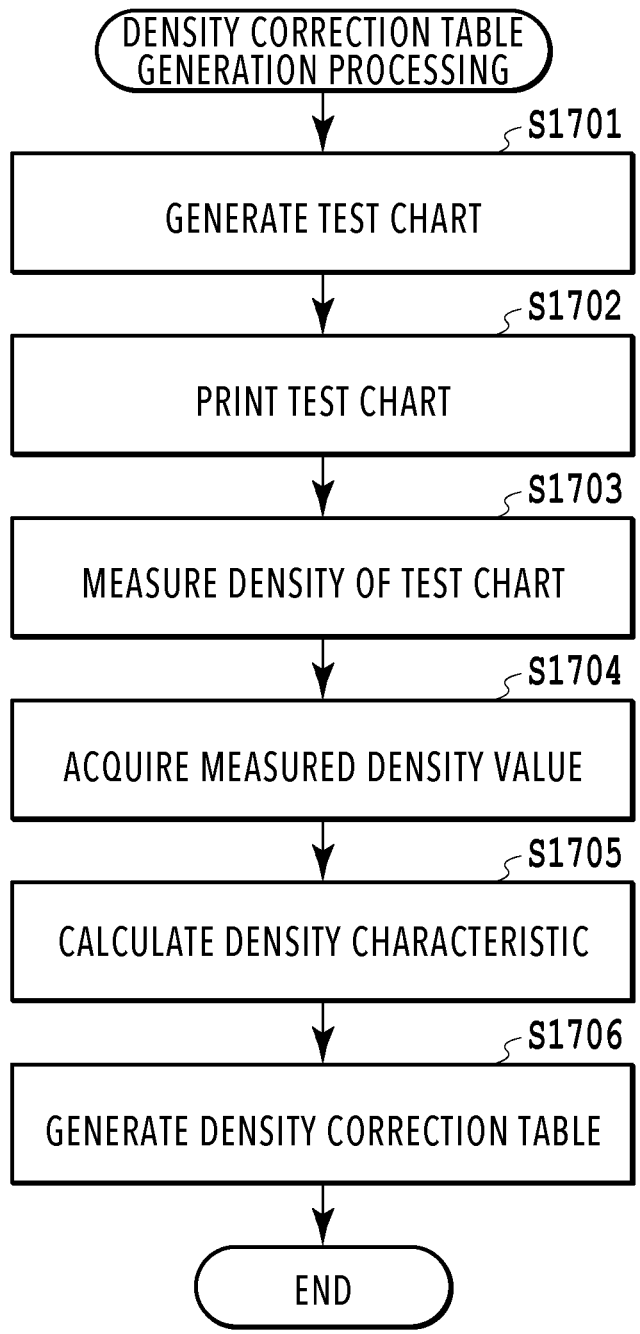
FIG. 17 is a flowchart showing a flow of processing until a density correction table is generated.

By using FIG. 16 and FIG. 17, a generation method of a density correction table by the density correction table generation unit 210 is explained. FIG. 16 is a diagram showing an example of a density correction test chart. The density correction test chart shown in FIG. 16 has a pattern area 1601. The pattern area 1601 includes an image 1602 including a solid density pattern whose density level of an input pixel value is 100% and a plurality of halftone patterns whose density level is different by 2% from one another. It is assumed that the range of the density level of an input pixel value is between 0 (0%) and 255 (100%). The density correction test chart shown in FIG. 16 is printed on a sheet by a command from a host computer, such as the PC 100, or a test print function of an image forming apparatus.

FIG. 17 is a flowchart showing a flow of processing until a density correction table is generated. The processing shown in FIG. 17 is performed in the case where the above-described command from a host computer is received or in the case where a user starts to make use of the test print function of the image forming apparatus 101.

Figure 18A:
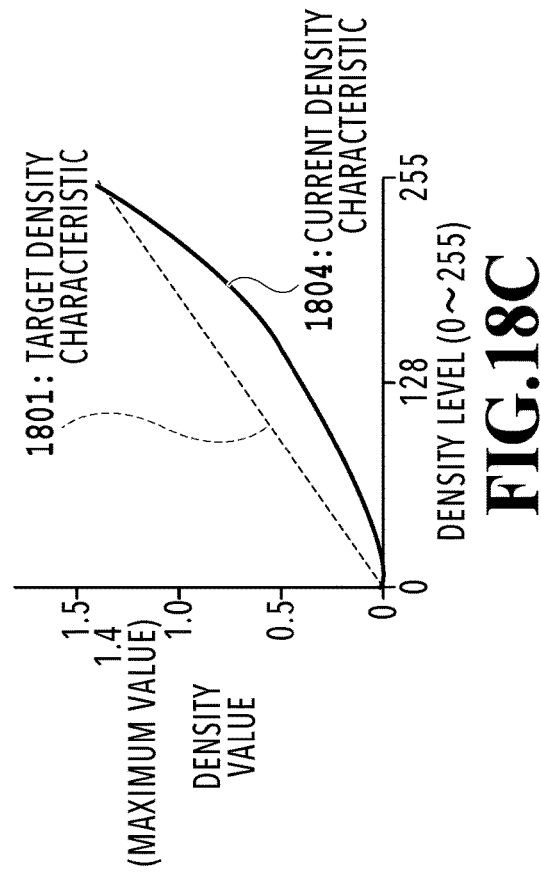
FIG. 18A to FIG. 18D are diagrams for explaining a relationship between a current density characteristic and a target density characteristic.
Figure 18B:
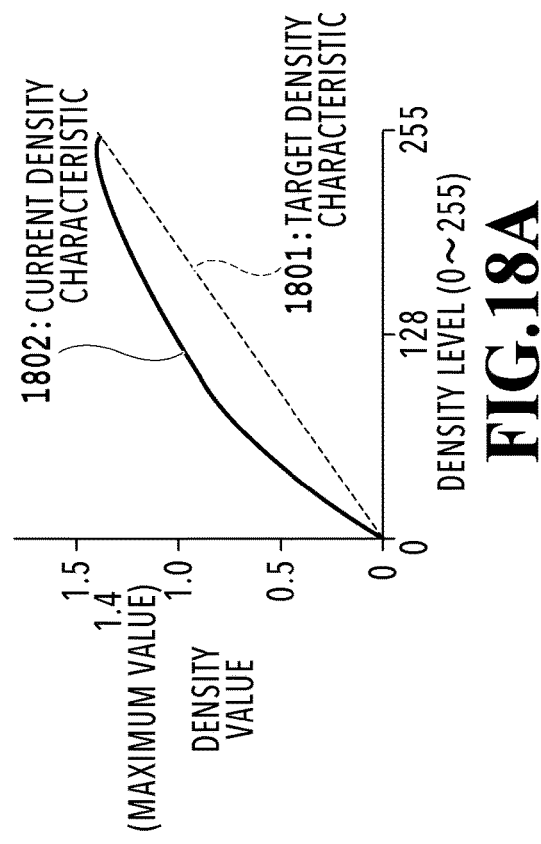
Figure 18C:
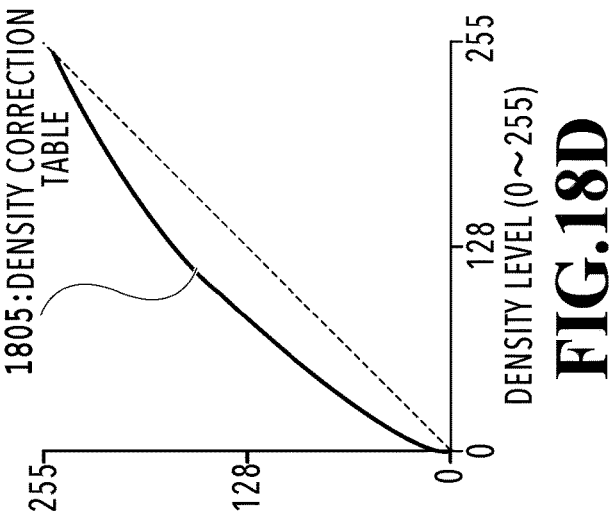

First, the controller 103 generates the density correction test chart shown in FIG. 16 (step S1701). The generated test chart is printed by the printer 104 (step S1702). A user places the test chart printed at step S1702 on the document table of the image forming apparatus 101 and inputs instructions to perform reading via the operation unit 102. Then, in response to the instructions to perform reading from the user, the test chart placed on the document table is read by the scanner 105. The controller 103 measures the density of the pattern at each density level from the test chart read by the scanner 105 (step S1703). The density correction table generation unit 210 of the controller 103 receives a density measurement value measured at step S1703 (step S1704) and calculates the density characteristic from the density measurement value of the pattern at each density level (step S1705). An example of the density characteristic calculated at this time is shown in FIG. 18A and FIG. 18C. A density characteristic 1801 indicates a density characteristic indicating a target density value and density characteristics 1802 and 1804 indicate density characteristics calculated at step S1705, that is, the current density characteristics.

FIG. 18A shows that the current density characteristic 1802 becomes higher than the target density characteristic 1801. In the case where the current density characteristic 1802 becomes higher than the target density characteristic 1801, a one-dimensional density correction table that reduces the density level of an input pixel and replaces the density level with the density level of the target density characteristic 1801 is created. A density correction table that is created at this time, that is, a density correction table that performs correction so that the current density characteristic 1802 shown in FIG. 18A becomes the target density characteristic 1801 is indicated by a density correction table 1803 shown in FIG. 18B.

Figure 18D:
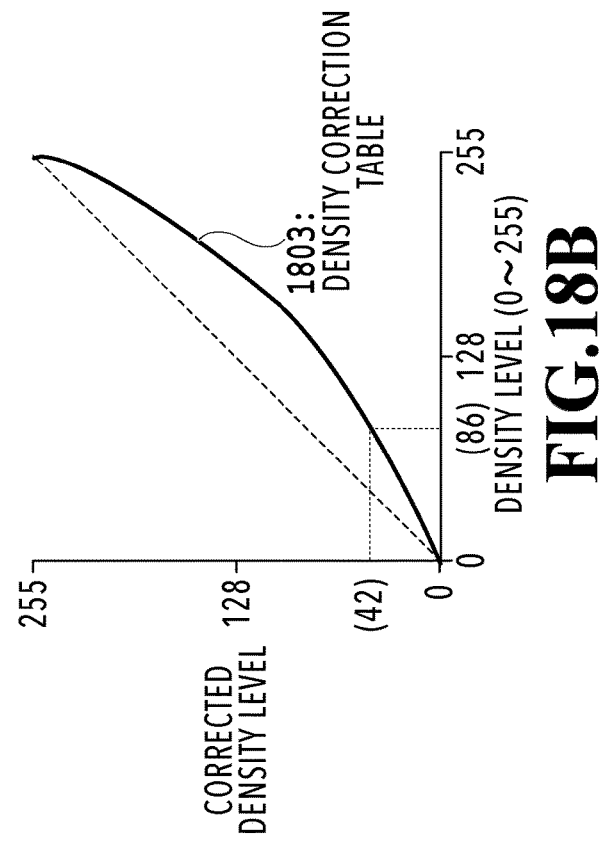

On the other hand, FIG. 18C shows that the current density characteristic 1804 becomes lower than the target density characteristic 1801. In the case where the current density characteristic 1804 becomes lower than the target density characteristic 1801, a one-dimensional density correction table that increases the density level of an input pixel and replaces the density level with the density level of the target density characteristic is created. A density correction table that is created at this time, that is, a density correction table that performs correction so that the current density characteristic 1804 shown in FIG. 18C becomes the target density characteristic 1801 is indicated by a density correction table 1805 shown in FIG. 18D.

[Dither Matrix Selection Processing]

Figure 19:
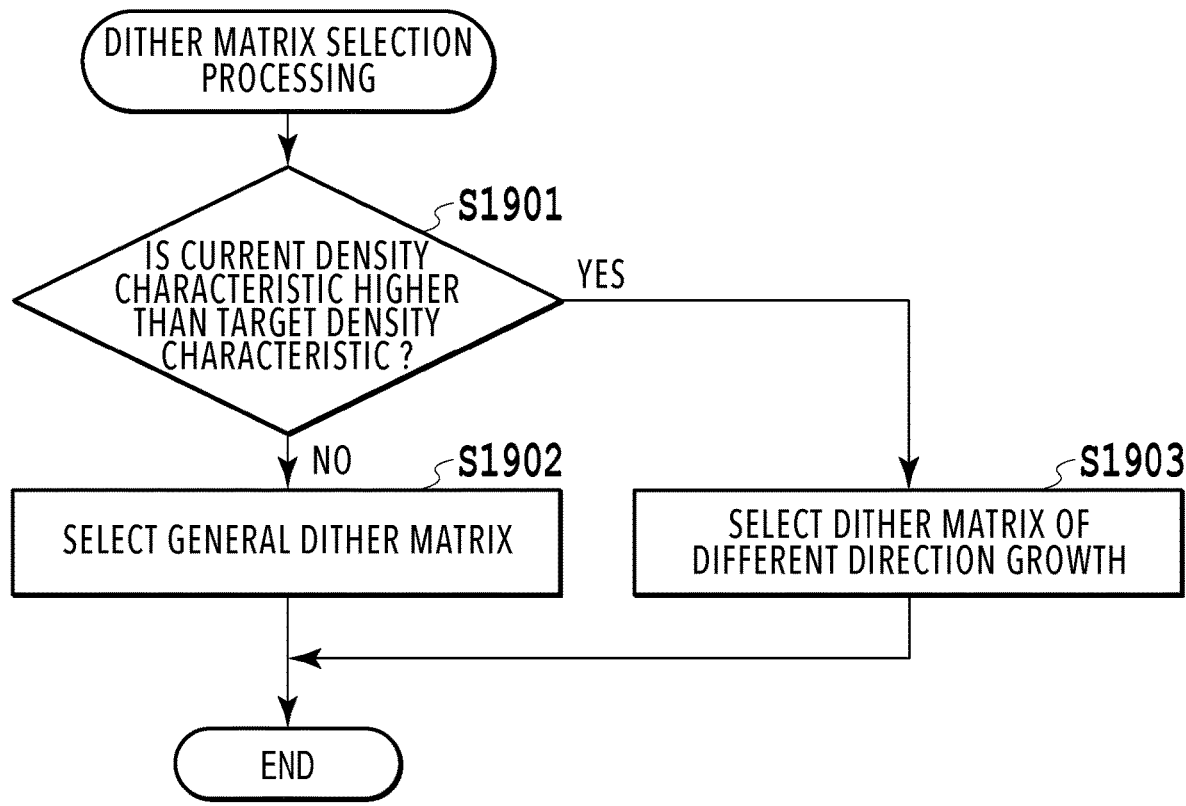
FIG. 19 is a flowchart showing a flow of dither matrix selection processing.

FIG. 19 is a flowchart showing a flow of dither matrix selection processing. The dither matrix selection processing is performed in the processing (pseudo halftone processing) at step S406 shown in FIG. 4.

First, the image processing unit 208 determines whether the current density characteristic calculated by the density correction table generation unit 210 is higher than the target density characteristic 1801 (step S1901). Then, in the case where the current density characteristic is lower than or equal to the target density characteristic 1801 (NO at step S1901), the image processing unit 208 selects the general dither matrix 702 shown in FIG. 7 (step S1902). On the other hand, in the case where the current density characteristic is higher than the target density characteristic 1801 (YES at step S1901), the image processing unit 208 selects the dither matrix 1103 of different direction growth or the dither matrix 1403 in order to suppress the disappearance of a thin line or the like whose density is low shown in FIG. 9A (step S1903).

As explained above, in the present embodiment, in the case where the current density characteristic is higher than the target density characteristic, by performing pseudo halftone processing by using a dither matrix of different direction growth, drawing failure of a low-density thin line or character (in particular, a small point character having an area whose width is narrow) and the like is suppressed. On the other hand, in the case where the current density characteristic is lower than or equal to the target density characteristic, by performing pseudo halftone processing by using a general dither matrix, the occurrence of moire is suppressed. As described above, by selecting a threshold value matrix suitable to a density characteristic and using the threshold value matrix in pseudo halftone processing, it is made possible to prevent deterioration in quality of a thin line or character while suppressing the occurrence of moire.

Other Embodiments

In the above-described embodiments, the dither matrix of different direction growth whose screen angle is 45 degrees and whose screen ruling is 106 lines is taken as an example. However, it is also possible to apply the present invention to a dither matrix made up of another screen degree and another screen ruling.

Further, in the above-described embodiments, the case where the dither matrix of different direction growth is a binary dither matrix is taken as an example, but it is also possible to apply the present invention to an N-value dither matrix. In the case where the present invention is applied to an N-value dither matrix, it is sufficient to set threshold values for each of (N−1) matrixes as in the case with the dither matrix of different direction growth according to the above-described embodiments.

Figure 20A:
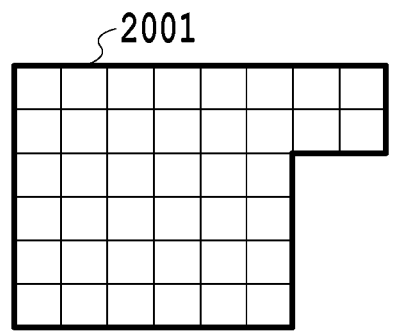
FIG. 20A and FIG. 20B are diagrams showing another example of a dither matrix of different direction growth.
Figure 20B:
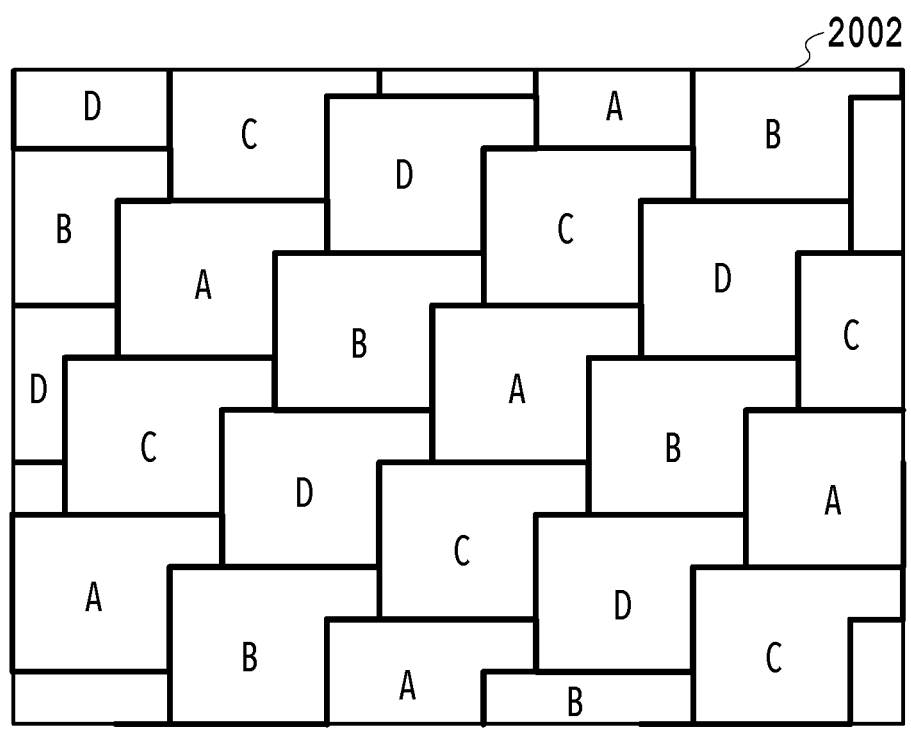

Further, in the above-described embodiments, the dither matrix of different direction growth in which rectangular cells are arranged is taken as an example. However, in a dither matrix of different direction growth, cells having another shape may be arranged in accordance with the screen ruling and screen angle. For example, it may also be possible to use a dither matrix 2002 as shown in FIG. 20B, which is obtained by arranging a cell 2001 having a shape as shown in FIG. 20A, in the pseudo halftone processing according to the above-described embodiments. A, B, C, and D within the cells shown in FIG. 20B indicate types of the above-described cell. That is, in the cells A, B, C, and D shown in FIG. 20B, the start point at which a dot is lit first is the same and the position at which a dot is lit second is different from one another. By using the dither matrix 2002 in the pseudo halftone processing, for example, it is made possible to prevent a diagonal thin line (thin line drawn along the angle of arrangement of the cells A, B, C, and D shown in FIG. 20B) from disappearing. As described above, by the dither matrix in which cells having another shape are arranged, it is possible to obtain the same effect as that of the above-described embodiments.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is made possible to prevent deterioration in quality of a thin line or character, which may result from pseudo halftone processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-224582, filed Nov. 22, 2017, which is hereby incorporated by reference wherein in its entirety.

What is claimed is:

1. An image processing apparatus comprising:
   a memory device storing at least a first threshold value matrix as a threshold value matrix used in halftone processing; and
   a controller having at least one processor which executes a set of instructions or having at least one circuitry, the controller being configured to act as:

a generation unit configured to generate halftone image data in which a dot pattern is formed for each cell, which is a unit representing a tone level, by performing halftone processing using the first threshold value matrix for multi-value input image data, wherein in the first threshold value matrix, threshold values for forming the dot pattern are arranged for each cell and further, in threshold value arrangement for each cell of the first threshold value matrix, the second smallest threshold value within the cell is arranged at a position neighboring a position at which the smallest threshold value within the cell is arranged, and the position at which the second smallest threshold value is arranged is different between adjacent cells.

2. The image processing apparatus according to claim 1, wherein the shape of the cell is rectangular, and the second smallest threshold value within the cell is arranged at one of positions of eight neighborhoods adjacent to the position at which the smallest threshold value is arranged.

3. The image processing apparatus according to claim 1, wherein in threshold value arrangement for each cell of the first threshold value matrix, the position at which the smallest threshold value is arranged is the same between adjacent cells.

4. The image processing apparatus according to claim 2, wherein in threshold value arrangement for each cell of the first threshold value matrix, the second smallest threshold value is arranged at one of positions in the upward direction, downward direction, rightward direction, and leftward direction, which are adjacent to the position at which the smallest threshold value is arranged.

5. The image processing apparatus according to claim 2, wherein in threshold value arrangement for each cell of the first threshold value matrix, the second smallest threshold value is arranged at one of positions in the diagonally upward to the right direction, diagonally downward to the right direction, diagonally upward to the left direction, and diagonally downward to the left direction, which are adjacent to the position at which the smallest threshold value is arranged.

6. The image processing apparatus according to claim 2, wherein in threshold value arrangement for each cell of the first threshold value matrix, with the position at which the smallest threshold value is arranged as a reference, each threshold value is arranged in ascending order in the same circling direction between adjacent cells.

7. The image processing apparatus according to claim 6, wherein the circling direction is a clockwise direction.

8. The image processing apparatus according to claim 1, wherein the memory device stores a second threshold value matrix along with the first threshold value matrix, the generation unit uses one of the first threshold value matrix and the second threshold value matrix in halftone processing in accordance with an output density characteristic of an image forming apparatus that forms an image based on the halftone image data, which is obtained by performing measurement in advance, and in the second threshold value matrix, threshold values for forming the dot pattern are arranged for each cell and further, in threshold value arrangement for each cell of the second threshold value matrix, the second smallest threshold value within the cell is arranged at one of positions of eight neighborhoods adjacent to the position at which the smallest threshold value within the cell is arranged, and the position at which the second smallest threshold value is arranged is the same between adjacent cells.

9. The image processing apparatus according to claim 8, wherein the generation unit selects:

the first threshold value matrix in a case where the output density characteristic is higher than a target density characteristic determined in advance, and the second threshold value matrix in a case where the output density characteristic is lower than or equal to the target density characteristic.

10. An image processing method in an image processing apparatus that performs halftone processing using a threshold value matrix for multi-value input image data, the method comprising the step of:

generating halftone image data in which a dot pattern is formed for each cell, which is a unit representing a tone level, from the input image data in halftone processing, wherein in the threshold value matrix, threshold values for forming the dot pattern are arranged for each cell and further, in threshold value arrangement for each cell of the threshold value matrix, the second smallest threshold value within the cell is arranged at a position neighboring a position at which the smallest threshold value within the cell is arranged, and the position at which the second smallest threshold value is arranged is different between adjacent cells.

11. The image processing method according to claim 10, wherein the shape of the cell is rectangular, and the second smallest threshold value within the cell is arranged at one of positions of eight neighborhoods adjacent to the position at which the smallest threshold value is arranged.

12. The image processing method according to claim 10, wherein in threshold value arrangement for each cell of the threshold value matrix, the position at which the smallest threshold value is arranged is the same between adjacent cells.

13. The image processing method according to claim 11, wherein in threshold value arrangement for each cell of the threshold value matrix, the second smallest threshold value is arranged at one of positions in the upward direction, downward direction, rightward direction, and leftward direction, which are adjacent to the position at which the smallest threshold value is arranged.

14. The image processing method according to claim 11, wherein in threshold value arrangement for each cell of the threshold value matrix, the second smallest threshold value is arranged at one of positions in the diagonally upward to the right direction, diagonally downward to the right direction, diagonally upward to the left direction, and diagonally downward to the left direction, which are adjacent to the position at which the smallest threshold value is arranged.

15. The image processing method according to claim 11, wherein in threshold value arrangement for each cell of the threshold value matrix, with the position at which the smallest threshold value is arranged as a reference, each threshold value is arranged in ascending order in the same circling direction between adjacent cells.

16. The image processing method according to claim 15, wherein the circling direction is a clockwise direction.

17. A non-transitory computer readable storage medium storing a program for causing a computer to perform an image processing method in an image processing apparatus that performs halftone processing using a threshold value matrix for multi-value input image data, the method comprising the step of:

generating halftone image data in which a dot pattern is formed for each cell, which is a unit representing a tone level, from the input image data in halftone processing, wherein in the threshold value matrix, threshold values for forming the dot pattern are arranged for each cell and further, in threshold value arrangement for each cell of the threshold value matrix, the second smallest threshold value within the cell is arranged at a position neighboring a position at which the smallest threshold value within the cell is arranged, and the position at which the second smallest threshold value is arranged is different between adjacent cells.

* * * * *